(12) United States Patent
Swanson et al.

(10) Patent No.: US 7,996,198 B2
(45) Date of Patent: Aug. 9, 2011

(54) MODELING CLASTIC RESERVOIRS

(75) Inventors: Donald C. Swanson, Houston, TX (US); Jeffrey S. Swanson, Houston, TX (US); Gregory A. Stevens, Sugar Land, TX (US)

(73) Assignee: Swanson Consulting, Inc., Houston, TX (US)

(*) Notice: Subject to any disclaimer, the term of this patent is extended or adjusted under 35 U.S.C. 154(b) by 1046 days.

(21) Appl. No.: 11/279,839

(22) Filed: Apr. 14, 2006

(65) Prior Publication Data
US 2006/0235668 A1 Oct. 19, 2006

Related U.S. Application Data

(60) Provisional application No. 60/671,163, filed on Apr. 14, 2005.

(51) Int. Cl.
*G06G 7/48* (2006.01)
(52) U.S. Cl. ........................................... 703/10
(58) Field of Classification Search ............... 703/10
See application file for complete search history.

(56) References Cited

U.S. PATENT DOCUMENTS

| | | | |
|---|---|---|---|
| 4,435,977 A | 3/1984 | Gournay | 73/152 |
| 4,752,882 A | 6/1988 | Givens | 702/13 |
| 6,246,963 B1 | 6/2001 | Cross et al. | |
| 2004/0141414 A1* | 7/2004 | Huffman et al. | 367/51 |

OTHER PUBLICATIONS

International Search Report for PCT/US06/14202 Mailed May 7, 2007.

Taherian, M.R., et al., "Spontaneous Potential: Laboratory Experiments and Modeling Results," The Log Analysis, pp. 34-48, Sep.-Oct. 1995.

Mathews, Diane M., et al., "Resistivity—Spontaneous Potential Crossplot for Enhanced Interpretation of Well Logs," Petroleum Engineering Department, Louisiana State University, pp. 14-19, Jul.-Aug. 1984.

Hallenburg, James K., "Use of the Spontaneous Potential Curve in a Mineral Mapping Technique," SPWLA Nineteenth Annual Logging Symposium, pp. 1-12, Jun. 13-16, 1978.

Taherian, M.R., et al., "Laboratory Study of the Spontaneous Potential: Experimental and Modeling Results," SPWLA 33rd Annual Logging Symposium, pp. 1-25, Jun. 14-17, 1992.

Marion, D., et al., "Modelling the Relationships Between Sonic Velocity, Porosity, Permeability, and Shaliness in Sand, Shale, and Shaley Sand," SPWLA Thirtieth Annual Logging Symposium, pp. 1-22, Jun. 11-14, 1989.

Osoba, J.S., et al., "Measurement of SP in Nonconducting Mud," SPWLA Tenth Annual Logging Symposium, pp. 1-12, May 25-28, 1969.

Aaboe, Erik, et al., "Influence of Shaliness Upon Conductivity in Shaly Sandstones in the Northern North Sea Area," SPWLA Twenty-Fifth Annual Logging Symposium, pp. 1-17, Jun. 10-13, 1984.

(Continued)

*Primary Examiner* — Albert Decady
*Assistant Examiner* — Eunhee Kim
(74) *Attorney, Agent, or Firm* — Baker Botts L.L.P.

(57) ABSTRACT

Methods, computer programs, and information handling systems for modeling one or more reservoirs are disclosed. The method uses one or more well logs, each for a well at a location and each including one or more Relative amount of Small Size Range of the Size Spectrum of Clastic Particles (RSSRSS) values versus depth. The method includes for one or more well logs: identifying one or more facies units based on RSSRSS values, determining a thickness of one or more facies units. The method includes determining a facies type of one or more facies units, categorizing one or more facies units, and connecting one or more facies units to create a reservoir model.

42 Claims, 17 Drawing Sheets

OTHER PUBLICATIONS

Capen, E.C., A Consistent Probabilistic Definition of Reserves, SPE Reservoir Engineering, pp. 23-31, Feb. 1996.

Hefner, J.M., "A Comparison of Probabilistic and Deterministic Reserve Estimates: A Case Study," SPE, Colorado School of Mines, pp. 43-47, Feb. 1996.

Cronquist, Chapman, "Discussion of a Comparison of Probabilistic and Deterministic Reserve Estimates: A Case Study," SPE, Consultant, pp. 134-135, May 1996.

Murtha, J.A., "Estimating Reserves and Success for a Prospect With Geologically Dependent Layers," SPE, Consultant, pp. 37-42, Feb. 1996.

Bristow, C.S., et al., "Crevasse Splays from the Rapidly Aggrading, Sand-Bed, Braided Niobrara River, Nebraska: Effect of Base-Level Rise," Sedimentology (1999) 46, pp. 1029-1047, 1999.

Skelly, Raymond L., et al., "Architecture of Channel-Belt Deposits in an Aggrading Shallow Sandbed Braided River: the Lower Niobrara River, Northeast Nebraska," Sedimentary Geology 158 (2003) pp. 249-270, 2003.

Ethridge, F.G., et al., "Avulsion and Crevassing in the Sandy, Braided Niobrara River: Complex Response to Base-Level Rise and Aggradation," Spec. Publs int. Ass. Sediment (1999) 28, pp. 179-191, 1999.

Bridge, John S., "Computer Simulation of Sedimentation in Meandering Streams," Sedimentology, (1975) 22, pp. 3-43, 1975.

Holeman, John N., "The Sediment Yield of Major Rivers of the World," Water Resources Research, vol. 4, No. 4, Aug. 1968, pp. 737-747.

Serra, O., et al., "Sedimentological Analysis of Shale-Sand Series from Well Logs," SPWLA Sixteenth Annual Logging Symposium, Jun. 4-7, 1975, pp. 1-23.

Hazzard, John C., "Use of Vertical Profile in Environmental Reconstruction," Bulletin of the American Association of Petroleum Geologists, vol. 49, No. 1 (Jan. 1985), pp. 41-61.

Selley, Richard C., "Subsurface Environmental Analysis of North Sea Sediments," The American Association of Petroleum Geologists Bulletin, V. 60, No. 2 (Feb. 1976), pp. 184-195.

Collins, D.R., et al., "Colour Image Transformations of Wireline Logs as a Medium for Sedimentary Profile Analysis," Bulletin of Canadian Petroleum Geology, vol. 36, No. 2 (Jun. 1988), pp. 186-190.

Saitta B., Sandro, "Subsurface Study of the Southern Portion of the Bluejacket Delta," Geology of the Bluejacket-Bartlesville Sandstone, Oklahoma City Geological Society, 1968, pp. 52-72.

Jican, F.X., et al., "Reservoir Modeling Methods and Characterization Parameters for a Shoreface Reservoir: What is Important for Fluid-Flow Performance!", SPE Reservoir Evaluation & Engineering, pp. 89-104, Apr. 2004.

Kretz, Vincent, et al., "An Integrated Reservoir Characterization Study Matching Production Data and 4D Seismic," SPE Reservoir Evaluation & Engineering, pp. 116-122, Apr. 2004.

Kabir, C.S., et al., "Handling Production-Data Uncertainty in History Matching: The Meren Reservoir Case Study," SPE Reservoir Evaluation & Engineering, pp. 123-132, Apr. 2004.

Martins, L.R., et al., "Grain Size and Modern Sedimentary Environments," Memorias del I Congreso Latinoamericano de Sedimentologia, Soc. Venezolana de Geol. Tomo II—67-71, Nov. 1997.

Porjesz, R., et al., "Geostatistical Methods to Validate and Choose Between Sedimentological and Structural Interpretations in VLA-31 of Block 1, Lake Maracaibo," Memorias del I Congreso Latinoamericano de Sedimentologia, Soc. Venezolana de Geol. Tomo II—181-190, Nov. 1997.

Volpi, B., et al., "Vertical Proportion Curves: A Qualitative and Quantitative Tool for Reservoir Characterization," Memorias del I Congreso Latinoamericano de Sedimentologia, Soc. Venezolana de Geol. Tomo II—351-358, Nov. 1997.

Liu, Yuhong, et al., "Multiple-point Stimulation Integrating Wells, Three-Dimensional Seismic Data, and Geology," AAPG Bulletin, V. 88, No. 7, pp. 905-921, Jul. 2004.

Thiele, Marco R., et al., "Using Streamline-Derived Injection Efficiencies for Improved Waterflood Management," SPE Reservoir Evaluation & Engineering, pp. 187-196, Apr. 2006.

Ozodgan, Umut, et al., "Optimization of Well Placement Under Time-Dependent Uncertainty," SPE Reservoir Evaluation & Engineering, pp. 135-144, Apr. 2006.

Loucks, R.G., et al., "Relationship of Porosity Formation and Preservation to Sandstone Consolidation History—Gulf Coast Lower Tertiary Frio Formation," Gulf Coast Association of Geological Societies, vol. XXVII, Geological Circular 77-5, 1977.

Sage, Leslie, Editor, "Early Universe", Nature Insight, vol. 440, Issue No. 7088, Apr. 2006.

Wood, Leslie J., "Quantitative Geomorphology of the Mars Eberswalde Delta," Geological Society of America, v. 118, No. 5/6, pp. 557-588, May/Jun. 2006.

Whitaker, Amy E., "Plate-Scale Stress Fields Driving the Tectonic Evolution of the Central Ouachita Salient, Oklahoma and Arkansas," Geological Society of America Bulletin, v. 118, pp. 709-710 and 725-732, May/Jun. 2006.

Myrow, Paul M., et al., "Cambrian Statigraphy and Depositional History of the Northern Indian Himalaya, Spiti Valley, North-Central India," GSA Bulletin, v. 118, No. 3/4, pp. 491-510, Apr. 2006.

Muto, et al., "Autogenic Attainment of Large-Scale Alluvial Grade with Steady Sea-Level Fall: An Analog Tank-Flume Experiment," GSA, v. 34, No. 3, pp. 161-164, Mar. 2006.

Carroll, Alan R., et al., "Feast to Famine: Sediment Supply Control on Laramide Basin Fill," GSA, v. 3-4, No. 3, pp. 197-200, Mar. 2006.

Benison, Kathleen, "A Martian Analog in Kansas: Comparing Martian Strata with Permian Acid Saline Lake Deposits," GSA, v. 34, No. 5, pp. 385-388, May 2006.

Leclair, Suzanne F., "New Pieces to the Puzzle of Reconstructing Sediment Paleofluxes from River Dune Deposits," GSA, v. 24, No. 5, pp. 401-404, May 2006.

"Thin Section, X-Ray Diffraction, Scanning Electron Microscope and Routine Core Analyses: Pemex Mission No. 25 Well, Burgos Basin, Mexico," David K. Davies & Associates, Inc., Apr. 18, 1996.

Alapetite, J. et al., "Stochastic Modeling of Fluvial Reservoirs: The YACS Approach," SPE 97271, Oct. 2005.

Mattax, Calvin C., et al., "Reservoir Simulation," Exxon Production Research Co., Jun. 1990.

Hewett, Thomas A., "Conditional Simulation of Reservoir Heterogeneity With Fractals," SPE, Chevron Oil Field Research Co., pp. 217-225, Sep. 1990.

White, C.D., "Translating Outcrop Data to Flow Models, With Applications to the Ferron Sandstone," SPE Resrvoir Eval. & Eng. 2(4), pp. 341-350, Aug. 1999.

Lucia, F. Jerry, "Geologic/Stochastic Mapping of Heterogeneity in a Carbonate Reservoir," SPE, pp. 1298-1303, Oct. 1990.

Tchelepi, H.A., et al, "Practical Use of Scale Up and Parallel Reservoir Simulation Technologies in Field Studies," SPE Reservoir Eval. & Eng. 2(4), pp. 368-376, Aug. 1999.

Weber, K.J., et al., "Framework for Constructing Clastic Reservoir Simulation Models," SPE, pp. 1248-1296, Oct. 1999.

Filho, Paulo Carlos Saldanha, et al., "Uncertainty Modeling of the Gas Volume of Manati Field: The Challenge of Taking into Account a 'Stochastic' Unconformity," SPE 95087-PP, pp. 1-5, 2005.

Tankersley, T.H., "Reservoir Modeling for Horizontal Exploitation of a Giant Heavy Oil Field—Challenges and Lessons Learned," SPE/Petroleum Society of CIM/CHOA 78957, pp. 1-6, 2002.

Fernandez, O., et al., "Three-Dimensional Reconstruction of Geological Surfaces: An Example of Growth Strata and Turbidite Systems from the Ainsa Basin (Pyrenees, Spain)," AAPG Bulletin, v. 88, No. 8, pp. 1049-1068, Aug. 2004.

Viseur, Sophie, "Stochastic Boolean Simulation of Fluvial Deposits: A New Approach Combining Accuracy with Efficiency," SPE 56688, pp. 1-8, 1999.

Aniekwena, Anthony U., "Integrated Characterization of the Thin-Bedded 8 Reservoir, Green Canyon 18, Gulf of Mexico," SPE 84051, pp. 1-11, 2003.

Abbaszadeh, Maghsood, "Integrated Geostatistical Reservoir Characterization of Turbidite Sandstone Deposits in Chicontepec Basin, Gulf of Mexico," SPE 84052, pp. 1-15, 2003.

Addy, Sunit K., et al., "Pinpointing New Potential of Mature Fields in Mexico: An Example from Vernet Field," The Leading Edge, pp. 1119-1121, Nov. 2003.

John, A., et al., "Seismic Facies Identification and Classification Using Simple Statistics," SPE 96577, pp. 1-9, 2005.
Ezekwe, J.N., "Modeling Deepwater Reservoirs,", SPE 95066, pp. 1-11, 2005.
Maharaja, A., et al., "Hierarchical Simulation of Multiple-Facies Reservoirs Using Multiple-Point Geostatistics," SPE 95574, pp. 1-15, 2005.
Amer, A., et al., "Interpreting the Depositional Facies of the Upper Gharif Fluvial System Using Oil-Based Mud Images: A Case Study in Central Oman," SPE 95584, pp. 1-13, 2005.
Pranter, M.J., "Deepwater Reservoir Modeling Using Sequence-Stratigraphic and Geomorphic Constraints," SPE 95952, pp. 1-11, 2005.
Hoffman, B.T., "Geologically Consistent History Matching of a Deepwater Turbidite Reservoir," SPE 95557, pp. 1-12, 2005.
Archer, R., "Splines as an Optimization Tool in Petroleum Engineering," SPE 95601, pp. 1-7, 2005
Mahgoub, I.S., "Applications of Sequence Stratigraphy and Geological Modeling to Mature Field Development: Khalda Ridge, Western Desert Egypt," SPE 95722, pp. 1-10, 2005.
Lach, J., et al., "Integration of Geologic and Dynamic Models for History Matching, Medusa Field," SPE 95930, pp. 1-11, 2005.
Fenwick, D., et al., "Reconciling Prior Geologic Information with Production Data Using Streamlines: Application to a Giant Middle-Eastern Oil Field," SPE 95940, pp. 1-13, 2005.
Hollund, K., "From Geological Knowledge to Good Decisions Using Simple Stochastic Models: A North Sea Case Study," SPE 97177, pp. 1-5, 2005.
Kalla, S., "Efficient Design of Reservoir Stimulation Studies for Development and Optimization," SPE 95456, pp. 1-14, 2005.
Daneshy, A.A., et al., "Accelerating Technology Acceptance: Overview," SPE 98553, pp. 1-4, 2005.
Arnold, K.E., "Accelerating Technology Acceptance: Is the Industry "Backbone" Strong Enough for Acceptance of New Technology?," SPE 98518, pp. 1-7, 2005.
Ferguson, S.E., "Accelerating Technology Acceptance: Blurring the Lines," SPE 98517, pp. 1-4, 2005.
Hirsch, J.M., "Accelerating Technology Acceptance: The Role of Culture of the Oil and Gas Industry in Technology Acceptance," SPE 98515, pp. 1-8, 2005.
Jacobs, S., "Accelerating Technology Acceptance: Prioritization and Assessment of Technology," SPE 98514, pp. 1-5, 2005.
Bates, T., "Accelerating Technology Acceptance: Nucleating and Funding E&P Technology," SPE 98513, pp. 1-10, 2005.
Rao, V., et al., "Accelerating Technology Acceptance: Hypotheses and Remedies for Risk-Averse Behavior in Technology Acceptance," SPE 98511, pp. 1-5, 2005.
Rietz, D., et al., "Reservoir Simulation and Reserves Classifications—Guidelines for Reviewing Model History Matches to Help Bridge the Gap Between Evaluators and Simulation Specialists," SPE 96410, pp. 1-10, 2005.
Bustamante, D.S., et al., "Understanding Reservoir Performance and Uncertainty Using a Multiple History Matching Process," SPE 95401, pp. 1-14, 2005.
Batycky, R.P., et al., "Revisiting Reservoir Flood-Surveillance Methods Using Streamlines," SPE 95402, pp. 1-9, 2005.
King, M.J., et al., "Optimal Coarsening of 3D Reservoir Models for Flow Simulation," SPE 95759, pp. 1-15, 2005.
Worthington, P.F., "The Application of Cutoffs in Integrated Reservoir Studies," SPE 95428, pp. 1-8, 2005.
le Ravalec-Dupin, Mickaele, et al., "Conditioning Truncated Gaussian Realizations to Static and Dynamic Data," SPE Journal, pp. 475-480, Nov. 2004.
Grimstad, Alv-Arne, et al., "Identification of Unknown Permeability Trends from History Matching of Production Data," SPE Journal, pp. 419-428, Jul. 2004.
Liu, Ning, et al., "Automatic History Matching of Geologic Facies," SPE Journal, pp. 429-464, Dec. 2004.
Hazlett, R.D., et al., "Optimal Well Placement in Heterogeneous Reservoirs Through Semianalytic Modeling," SPE Journal, pp. 286-296, Sep. 2005.
Hu, Lin Y., et al., "History Matching of Object-Based Stochastic Reservoir Models," SPE Journal, pp. 312-322, Sep. 2005.

Muneta, Y., et al., "Formulation of Capillary Force Barriers in Moderately Oil-Wet Systems and Their Application to Reservoir Simulation," SPE Reservoir Evaluation & Engineering, pp. 388-396, Oct. 2005.
McKishnie, R.A., et al., "Streamline Technology for the Evaluation of Full-Field Compositional Processes: Midale—A Case Study," SPE Reservoir Evaluation & Engineering, pp. 404-416, Oct. 2005.
Saller, Arthur H., et al., "Linked Lowstand Delta to Basin-Floor Fan Deposition, Offshore Indonesia: An Analog for Deep-Water Reservoir Systems," AAPG Bulleting, v. 88, No. 1, pp. 21-46, Jan. 2004.
"Sedimentation from Jets: A Depositional Model for Clastic Deposits of all Scales and Environments," AAPG Annual Convention, Salt Lake City, Utah, May 11-14, 2003.
"Ultra-High Resolution 3-D Characterization of Deep-Water Deposits—II: Insights into the Evolution of a Submarine Fan and Comparisons with River Deltas," AAPG Annual Convention, Salt Lake City, Utah, May 11-14, 2004.
Bowen, D.W., et al., "Reservoir Geology of Nicholas and Liverpool Cemetery Fields (Lower Pennsylvanian), Stanton County, Kansas, and Their Significance to the Regional Interpretation of the Morrow Formation Incised-Valley-Fill Systems in Eastern Colorado and Western Kansas," AAPG Bulletin, v. 88, No. 1, pp. 47-70, Jan. 2004.
Bowen, D.W., et al., "Regional Sequence Stratigraphic Setting and Reservoir Geology of Morrow Incised-Valley Sandstones (Lower Pennsylvanian), Eastern Colorado and Western Kansas," AAPG Bulletin, v. 87, No. 5, pp. 781-815, May 2003.
Sneider, Robert M., "Bibliography Productive Low Resistivity Well Logs of the Offshore Gulf of Mexico," C-1 to C-20, 1992.
Zemanek, J., "Low-Resistivity Hydrocarbon-Bearing Sand Reservoirs," SPE 15713, pp. 185-197, 1987.
Cook, Jr., Philip L., et al., "Trimble Field, Mississippi: 100 bcf of Bypassed, Low Resistivity Cretaceous Eutaw Pay at 7,000 Ft.," OGJ, vol. 88, No. 43, pp. 96-102, Oct. 22, 1990.
Schulze, R.P., et al., "Evaluation of Low-Resistivity Simpson Series of Formations," SPE 14282, pp. 1-8, 1985.
Vajnar, E.A., et al., "Low Resistivity Masks High Potential of Gulf Coast Sand," World Oil, vol. 186, No. 2, pp. 49-54, Feb. 1, 1978.
Haldorsen, Helge H., et al., "Stochastic Modeling," SPE, pp. 404-412, Apr. 1990.
Scheepens, C.C.J., "3D Modeling Using Multiple Scenarios and Realizations for pre-Reservoir Simulation Screening," SPE 82022, pp. 1-4, 2003.
Cheong, Y.P., "Experimental Design and Analysis Methods for Assessing Volumetric Uncertainties," SPE Journal, pp. 324-336, Sep. 2005.
Hand, J.L., "Ability of Geostatistical Simulations to Reproduce Geology: A Critical Evaluation," SPE 28414, pp. 553-545, 1994.
Jian, F.X.,. et al., "Reservoir Modeling Methods and Characterization Parameters for a Shoreface Reservoir: What is Important for Fluid Flow Performance!," SPE 77428, pp. 1-11, 2002.
Deutsch, Clayton V., et al., "Hierarchical Object-Based Stochastic Modeling of Fluvial Reservoirs," International Association for Mathematical Geology, pp. 857-880, 1996.
Bridge, John S., "A Simulation Model of Alluvial Stratigraphy," Sedimentology 26, pp. 617-644, 1979.
Mackey, Scudder D., et al., "Three-Dimensional Model of Alluvial Stratigraphy: Theory and Application," Journal of Sedimentary Research, vol. B65, No. 1, pp. 7-31, Feb. 1995.
Karssenberg, Derek, "Conditioning a Process-Based Model of Sedimentary Architecture to Well Data," Journal of Sedimentary Research, vol. 71, No. 6, pp. 868-879, Nov. 2001.
Perez, Hector H., "The Role of Electrofacies, Lithofacies, and Hydraulic Flow Units in Permeability Prediction from Well Logs: A Comparative Analysis Using Classification Trees," SPE Reservoir Evaluation & Engineering, pp. 143-155, Apr. 2005.
Ates, Harun, "Ranking and Upscaling of Geostatistical Reservoir Models by Use of Streamline Simulation: A Field Case Study," SPE Reservoir Evaluation & Engineering, pp. 22-32, Feb. 2005.
Dutton, Shirley, P., et al., "Play Analysis and Leading-Edge Oil-Reservoir Development Methods in the Permian Basin: Increased Recovery Through Advanced Technologies," AAPG Bulletin, v. 89, No. 5, pp. 553-576, May 2005.

Barrash, Warren, et al., "Significance of Porosity for Stratigraphy and Textural Composition in Surface, Coarse Fluvial Deposits: Boise Hydrogeophysical Research Site," GSA Bulletin, v. 116, No. 9/10, pp. 1059-1073, Sep./Oct. 2004.

Wynn, Russell B., "Characterization and Recognition of Deep-Water Channel-Lobe Transition Zones," AAPG Bulletin, v. 86, No. 8, pp. 1441-1462, Aug. 2002.

Beaubouef, R.T., "Deep-Water Leveed-Channeo Complexes of the Cerro Torro Formation, Upper Cretaceous, Southern Chile," AAPG Bulletin, v. 88 No. 11, pp. 1471-1500, Nov. 2004.

Brown, Jr., L. Frank, et al., "Understanding Growth-Faulted, Intraslope Subbasins by Applying Sequence-Stratigraphic Principles: Examples From the South Texas Oligocene Frio Formation," AAPG Bulletin, v. 88, No. 11, pp. 1501-1522, Nov. 2004.

Pyrcz, Michael J., et al., "Stochastic Surface-Based Modeling of Turbidite Lobes," AAPG Bulletin, v. 89, No. 2, pp. 177-191, Feb. 2005.

Svanes, et al., "Integration of Subsurface Applications to Develop a Dynamic Stochastic Modeling Workflow," AAPG Bulletin, v. 88, No. 10, pp. 1369-1390, Oct. 2004.

Ratcliffe, K.T., et al., "An Example of Alternative Correlation Techniques in a Low-Accommodation Setting, Nonmarine Hydrocarbon System: The (Lower Cretaceous) Mannville Basal Quartz Succession of Southern Alberts," AAPG Bulletin, v. 88, No. 10, pp. 1419-1432, Oct. 2004.

Yoshida, Shuji, et al., "Transgressive Changes From Tidal Estaurine to Marine Embayment Depositional Systems: The Lower Cretaceous Woburn Sands of Southern England and Comparison with Holocene Analogs," AAPG Bulletin, v. 88, No. 10, pp. 1433-1460, Oct. 2004.

Soeder, D.J., et al., "Pore Geometry in High- and Low-Permeability Sandstones, Travis Peak Formation, East, Texas," SPE Formation Evaluation, pp. 421-430, Dec. 1990.

Davies, D.K., et al., "Reservoir Geometry and Internal Permeability Distribution in Fluvial, Tight, Gas Sandstones, Travis Peak Formation, Texas," SPE Reservoir Engineering, pp. 7-11, Feb. 1993.

Tyler, Kelly J., "Heterogeneity Modeling Used for Production Simulation of a Fluvial Reservoir," SPE Formation Evaluation, pp. 85-92, Jun. 1994.

Fetkovich, M.J., et al., "Multiwell, Multilayer Model to Evaluate Infill-Drilling Potential in the Oklahoma Hugoton Field," SPE, pp. 161-168, 1994.

Kaiser, W.R., et al., "Geologic and Hydrologic Characterization of Coalbed-Methane Reservoirs in the San Juan Basin," SPE Formation Evaluation, Sep. 1994.

Sharma, Bijon, et al., "Determining the Productivity of a Barrier Island Sandstone Deposit from Integrated Facies Analysis," SPE Formation Evaluation, pp. 413-420, Dec. 1990.

Weber, K.J., et al., "Framework for Constructing Clastic Reservoir Simulation Models," SPE, pp. 1248-1254, Oct. 1990.

Kittridge, Mark G., "Outcrop/Subsurface Comparisons of Heterogeneity in the San Andres Formation," SPE Formation Evaluation, pp. 233-240, Sep. 1990.

Kossack, Charles A., "Scaling Up Heterogeneities With Pseudofunctions," SPE Formation Evaluation, pp. 226-232, Sep. 1990.

Henriquez, Adolfo, et al., "Characterization of Fluvial Sedimentology for Reservoir Simulation Modeling," SPE, pp. 213-224, 1990.

Haldorsen, Heige H., On the Modeling of Vertical Permeability Barriers in Single-Well Simulation Models, SPE Evaluation, pp. 349-358, Sep. 1989.

Jensen, Jerry L., "A Statistical Study of Reservoir Permeability: Distributions, Correlations, and Averages," SPE Formation Evaluation, pp. 461-468, Dec. 1987.

Busch, J.M., et al., "Determination of Lithology from Well Logs by Statistical Analysis," SPE Formation Evaluation, pp. 412-418, Dec. 1987.

Szpakiewicz, M., et al., "Geologic Problems Related to Characterization of Clastic Reservoirs for EOR," SPE Formation Evaluation, pp. 449-460, Dec. 1987.

Jones, J.R., et al., "The Geologic Aspects of Reservoir Characterization for Numerical Simulation: Mesaverde Meanderbelt Sandstone, Northwestern Colorado," SPE Formation Evaluation, pp. 97-108, Mar. 1987.

Tehrani, D.H., "An Analysis of a Volumetric Balance Equation for Calculation of Oil in Place and Water Influx," Journal of Petroleum Technology, pp. 1664-1670, 1985.

Banks, Richard, B., "Computer Stacking of Multiple Geologic Surfaces," Petro Systems World, pp. 14-16, Winter 1993.

Journel, Andre G., et al., "Stochastic Imaging of the Wilmington Clastic Sequence," SPE, pp. 33-40, 1993.

Wolcott, Don S., et al., "Incorporating Reservoir Heterogeneity With Geostatistics to Investigate Waterflood Recoveries," SPE Formation Evaluation, pp. 26-32, Mar. 1993.

Aasum, Yngve, et al., "An Application of Geostatistics and Fractal Geometry for Reservoir Characterization," SPE, pp. 11-19, Mar. 1991.

Carr, L.A., et al., "A Complex Reservoir Characterized by Three-Dimensional Seismic, Geostatistical Reservoir Description, and Sponge-Core Analysis," SPE Formation Evaluation, pp. 335-342, Sep. 1989.

Meunier, G., et al., "Geostatistics Applied to Gas Reservoirs," SPE Formation Evaluation, pp. 327-334, Sep. 1989.

Emanuel, A.S., et al., "Reservoir Performance Prediction Methods Based on Fractal Geostatistics," SPE Reservoir Engineering, pp. 311-318, Aug. 1989.

LeBlanc, Sr., R.J., "Distribution and Continuity of Sandstone Reservoirs—Part 2," Journal of Petroleum Technology, pp. 793-804, Jul. 1977.

Sneider, R.M., et al., "Predicting Reservoir Rock Geometry and Continuity in Pennsylvanian Reservoirs, Elk City Field, Oklahoma," Journal of Petroleum Technology, pp. 851-866, Jul. 1977.

Reitzel, G.A., et al., "Pool Description and Performance Analysis Leads to Understanding Golden Spike's Miscible Flood," Journal of Petroleum Technology, pp. 867-872, Jul. 1977.

Jardine, D., et al., "Distribution and Continuity of Carbonate Reservoirs," Journal of Petroleum Technology, pp. 873-884, Jul. 1977.

Morgan, J.T., et al., "Tensleep Reservoir Study, Oregon Basin Field, Wyoming—Reservoir Characteristics," Journal of Petroleum Technology, pp. 886-896, Jul. 1997.

McMillan, Margaret E., et al., "History and causes of post-Laramide relief in the Rocky Mountain orogenic plateau", GSA Bulletin; v. 118; No. 3/4; p. 393-405, Mar./Apr. 2006.

UK Search Report (GB0607624.4), Aug. 2, 2006.

Satur N.; Kelling G; Cronin B T; Hurst A; Gurbuz K; Sedimentary architecture of a canyon-style fairway feeding a deep-water clastic system, the Miocene Cingoz Formation, southern Turkey: significance for reservoir characterisation and modelling; Sedimentary Geology, Elsevier, vol. 173, Nr: 1-4, 2003.

* cited by examiner

MODELING CLASTIC RESERVOIRS

CROSS-REFERENCE TO RELATED APPLICATION

This application claims priority to commonly owned U.S. provisional patent application Ser. No. 60/671,163, filed Apr. 14, 2005, entitled "Modeling Clastic Reservoirs," by Donald C. Swanson, Jeffrey S. Swanson, and Gregory A. Stevens, which is incorporated herein by reference.

BACKGROUND

Underground fluid exploration and extraction is often an expensive and uncertain venture. Modeling of fluid reservoirs may help to increase the return on investment for fluid exploration and extraction operations.

SUMMARY

In general, in one aspect, the invention features a method of modeling one or more reservoirs using one or more well logs. Each log is for a well at a location and each and includes one or more Relative amount of Small Size Range of the Size Spectrum of Clastic Particles (RSSRSS) values versus depth. The method includes, for one or more well logs, identifying one or more facies units based on RSSRSS values and determining a thickness of one or more facies units. The method further includes determining a facies type of one or more facies units, categorizing one or more facies units, and connecting one or more facies units to create a reservoir model.

In general, in a second aspect, the invention features a computer program, stored in a tangible medium, for modeling one or more fluid reservoirs using one or more well logs. Each is for a well at a location and includes one or more RSSRSS values versus depth. The computer program includes executable instructions that cause at least one processor to identify one or more facies units based on RSSRSS values and determine a thickness of one or more facies units, for one or more well logs. The executable instructions cause at least one processor to determine a facies type of one or more facies units, categorize one or more facies units; and connect one or more facies units to create a reservoir model.

In general, in a third aspect, the invention features an information handling system that includes one or more controllers, one or more data storage facilities, where each of the one or more controllers providing access to one or more data storage facilities, and a process for execution on one or more of the controllers for modeling one or more fluid reservoirs using one or more well logs, each for a well at a location and each including one or more Relative amount of Small Size Range of the Size Spectrum of Clastic Particles (RSSRSS) values versus depth. The process includes identifying one or more facies units based on RSSRSS values and determining a thickness of one or more facies units for one or more well logs. The process includes determining a facies type of one or more facies units, categorizing one or more facies units, and connecting one or more facies units to create a reservoir model.

One advantage of the claimed computer program and method is the modeling of fluvial deltaic conduits. Another advantage of the claimed computer program and method is the modeling of zero well areas.

Other and further features and advantages will be apparent from the following description of presently preferred embodiments of the invention, given for the purpose of disclosure and taken in conjunction with the accompanying drawings. Not all embodiments of the invention will include all the specified advantages. For example, one embodiment may only model depletion corresponding to a particular well, while another embodiment only models locations of preferred fluid flow.

BRIEF DESCRIPTION OF THE DRAWINGS

FIGS. 6 and 7-9 are example well logs.

DETAILED DESCRIPTION

Figure 1:
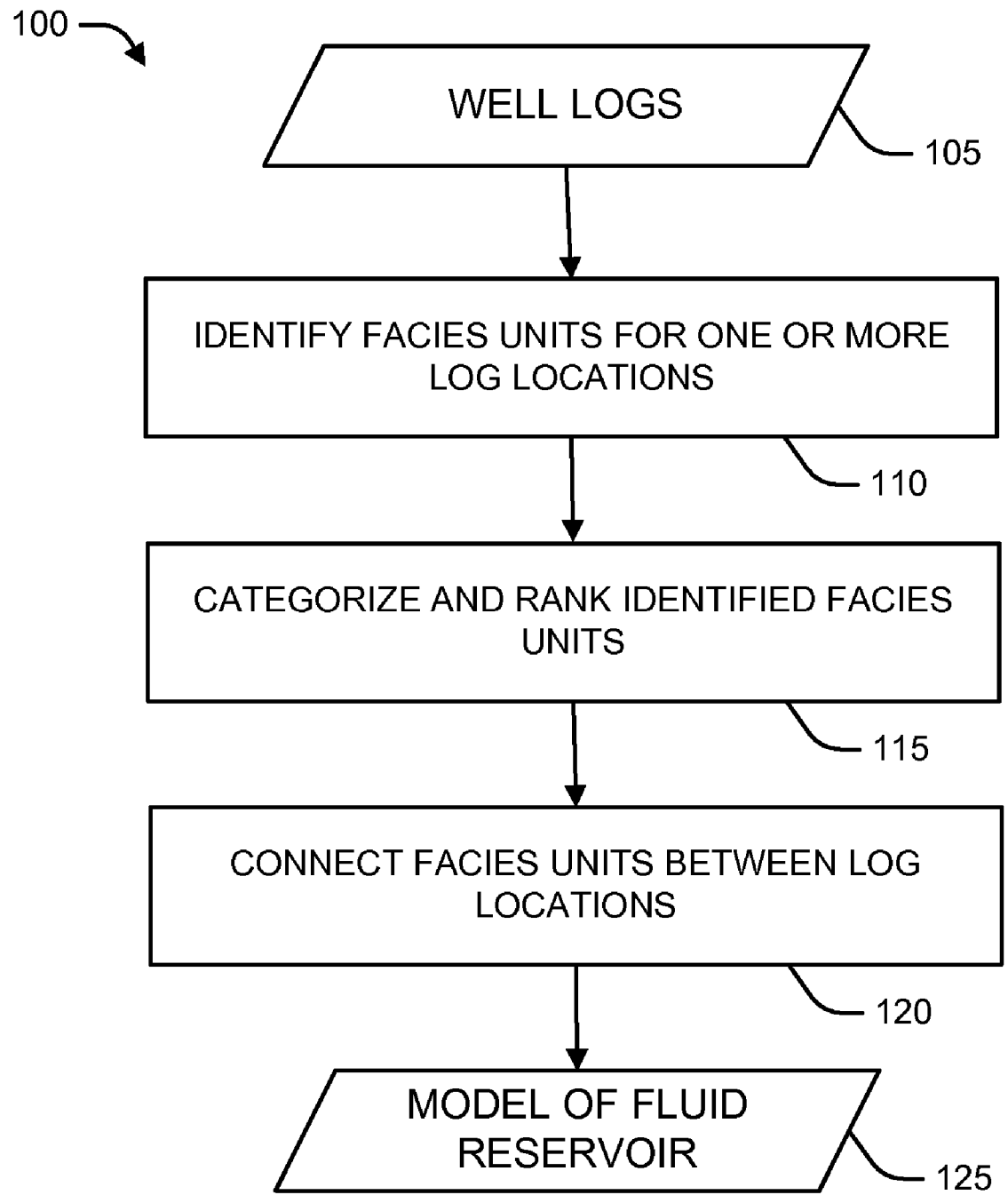
FIGS. 1-5, 7, 10-13, and 15 are flow charts of an example system for modeling a fluid reservoir.

An example system 100 for modeling a fluid reservoir is shown in FIG. 1. The system receives and processes one or more well logs for use (block 105, the processing of which is shown in greater detail in FIG. 2). In general, the layers of earth in a well may contains various sized particles in the size spectrum of classic particles, including small size range of the size spectrum of classics particles (SSRSS). Certain well logs show a relative measure of SSRSS (RSSRSS) versus depth for the log location. In one example system, the well logs are Spontaneous Potential (SP) logs. In another example system, the well logs are gamma ray (GR) logs. The measurements of the SP and GR logs may correspond directly to the RSSRSS.

One well log used is the Spontaneous Potential curve, which is a recorded measurement of a natural earth EMF, which is generally measured in mV. It is set up among the mud filtrate in the well bore, the reservoir connate water and the sealing SSRSS lying above and below the clastic reservoir deposit when the various sediment resistivities are in favorable relationship to one another. This may occur, for example, when the resistivity of the mud filtrate is much greater than the resistivity of the connate water.

Another well log that may be used is the reading of natural occurring gamma radiation of the sediments along the wall of drill holes. The Gamma Ray emissions can be recorded by different devices among them gas ionization counters and scintillation detectors. Along with the identification and measuring of the thickness of reservoir and non-reservoir deposits, another function of both logs (SP and GR) is their ability to measure the presence SSRSS Relative amount of the Smallest Size Range within the Size Spectrum of Detrital Clastic Sediment (RSSRSS).

The SSRSS particles consist mostly of two basic constituents: 1) fine silt size (e.g., <0.03 mm) particles of rocks and minerals (usually silicates), and 2) molecular "plates" of allergenic clay minerals, the most common being chlorite, illite, kaolin, or symmetric groups or mixed layer clays formed form these components. It is rare that the SSRSS deposits "completely" consist of grained quartz or silicates and/or clay mineral plates (as claystone). There is almost always varied minor amount of coarser silt and/or sand sized particles. The overall mixture is usually referred to as being shale and varying amounts in other sediment as contributing an essence of shaliness.

SSRSS or shaliness affects the SP and GR log curves of clastic sediment differently. Natural radioactive minerals uranium, thorium, and potassium, and especially uranium tend to collect and be concentrated in SSRSS deposits, especially in the dark gray to black organic shales. Any deposit, however, whether it is a grain clastic rock like a clastic reservoir or a carbonate may occasionally emit natural gamma rays. Usually, however, the relationship between a high gamma ray count and a SSRSS deposit is reliable enough so that maximum GR readings can be used as the 100 percent shale baseline and along with the least gamma count readings can set up a useful volume of SSRSS mathematical relationship.

The presence of SSRSS in a clastic sediment affects the SP reading differently than the radioactive connection between a deposit and a gamma ray detector. SSRSS in a clastic reservoir reduces the millivolt reading by increasing the overall resistivity (more resistivity=less current). This is done by two physical phenomena: 1) by blocking the continuity and connectivity within the conductive reservoir fluid; and 2) by supplanting within the reservoir pore space volume that would otherwise have very conductive slat water. By being reduced in amplitude by the amount and connectivity of low resistance fluid in the pore space, the SP negative voltage varies as a function of the amount of SSRSS particles. This "mathematical" phenomenon is evident whether or not the SSRSS intrusive particles exist as intergranular particles and/or masses, as thin displaced, disrupted "whisps" of SSRSS laminae, or as continuous laminae or thin beds. By using and normalizing the least negative minimum of the SP reading a SP shale baseline can be interpreted and when used within the maximum, negative—millivolt SP reading a volume of SSRSS particles, mathematic relationship can be used in a manner similar to the method used with gamma ray counts.

Figure 4:
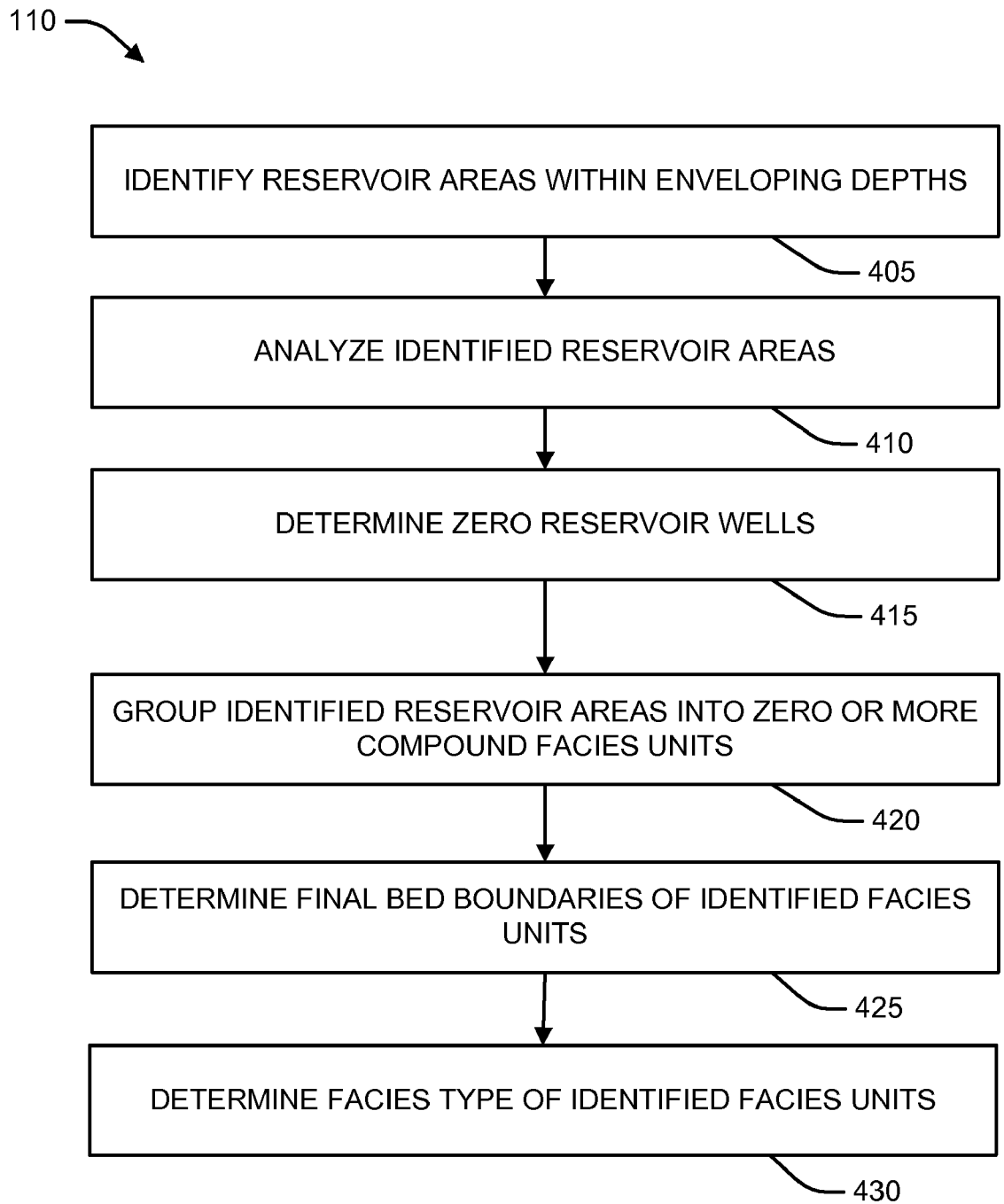

The system identifies facies units for one or more of the well log locations (block 110, which is shown in greater detail in FIG. 4). The system categorizes and ranks one or more of the identified facies units (block 115, which is shown in greater detail in FIG. 10). The system connects the facies units between the well log locations (block 115, which is shown in greater detail in FIG. 11).

Figure 2:
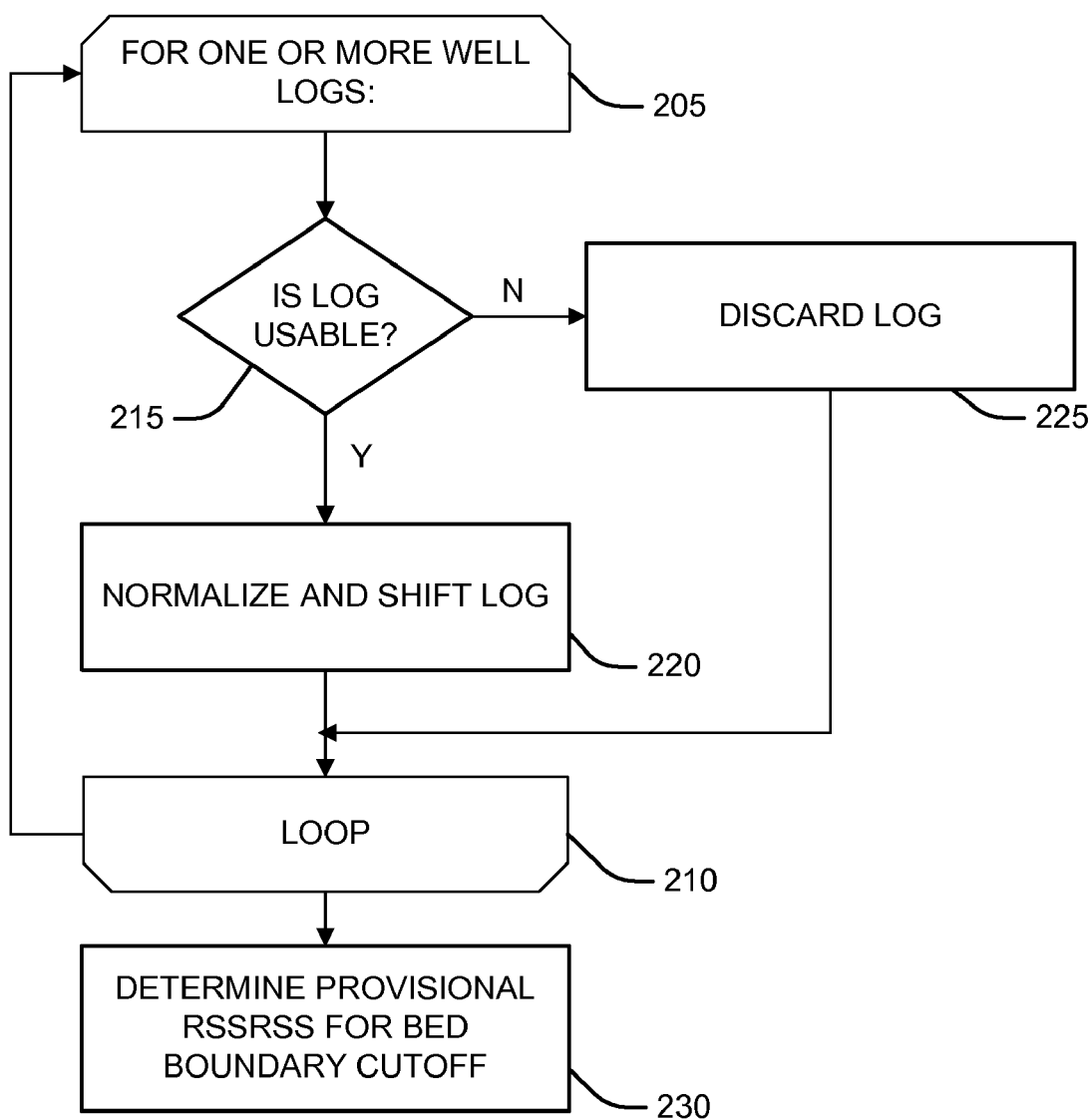

An example system for preparing well log data for analysis (block 105) is shown in FIG. 2. The system enters a loop for one or more well logs (blocks 205 and 210). As discussed above, in certain example systems, one or more of the logs may be SP logs and one or more of the logs may be GR logs. In general, any log that is usable to determine RSSRSS versus depth is suitable for use. Within the loop, the system determines if the log is usable (block 215). In certain example systems, this analysis may include determining if the header information for the log is substantially complete or correct. For example, the header information in one or more logs may include one or more of a location where the log was taken, a resistivity of the mud ($R_M$), a resistivity of the mud filtrate ($R_{MF}$), and a resistance of permeable reservoir deposit connate water ($R_W$). If one or more of these pieces of information are missing, out of range, or inconsistent with other data, the system may determine that the log is not usable. Certain example systems may receive one or more porosity logs. The example system determines if the well logs are consistent with the porosity logs. If the log is not usable, the system discards the log (block 225). Otherwise, the system normalizes and shifts the baseline of the log (block 220). In general SP and GR logs tend to exhibit increasing skew versus depth. Example systems will correct for the skew in the SP and GR measurements versus depth by shifting the RSSRSS values to account for this skew. The system may normalize the baseline of the log automatically, or the system may be fully or partially assisted by the operator. In certain example systems, the system for preparing data for analysis may digitize one or more logs that are plotted to determine or more RSSRSS values versus depth.

After exiting the loop, the system determines a provisional RSSRSS cutoff value for determining whether a location in a well is or is not a reservoir bed (block 230). In certain example systems the provisional RSSRSS cutoff value is determined based on one or more of $R_M$, $R_{MF}$, $R_W$, a resistance of confining or surrounding shale or SSRSS for a well ($R_{SH}$), a resistance of uninvaded permeable reservoir deposits ($R_T$). In one example embodiment, the provisional RSSRSS cutoff value is determined using the following formula:

$$1 - \left[ \frac{\sqrt{\frac{R_T}{R_{SH}}}}{1 + \sqrt{\frac{R_T}{R_{SH}}}} \right] \quad \text{(Equation 1)}$$

where the result is a distance from the axis where RSSRSS is equal to 1 (i.e., the maximum SSRSS baseline).

Figure 3:
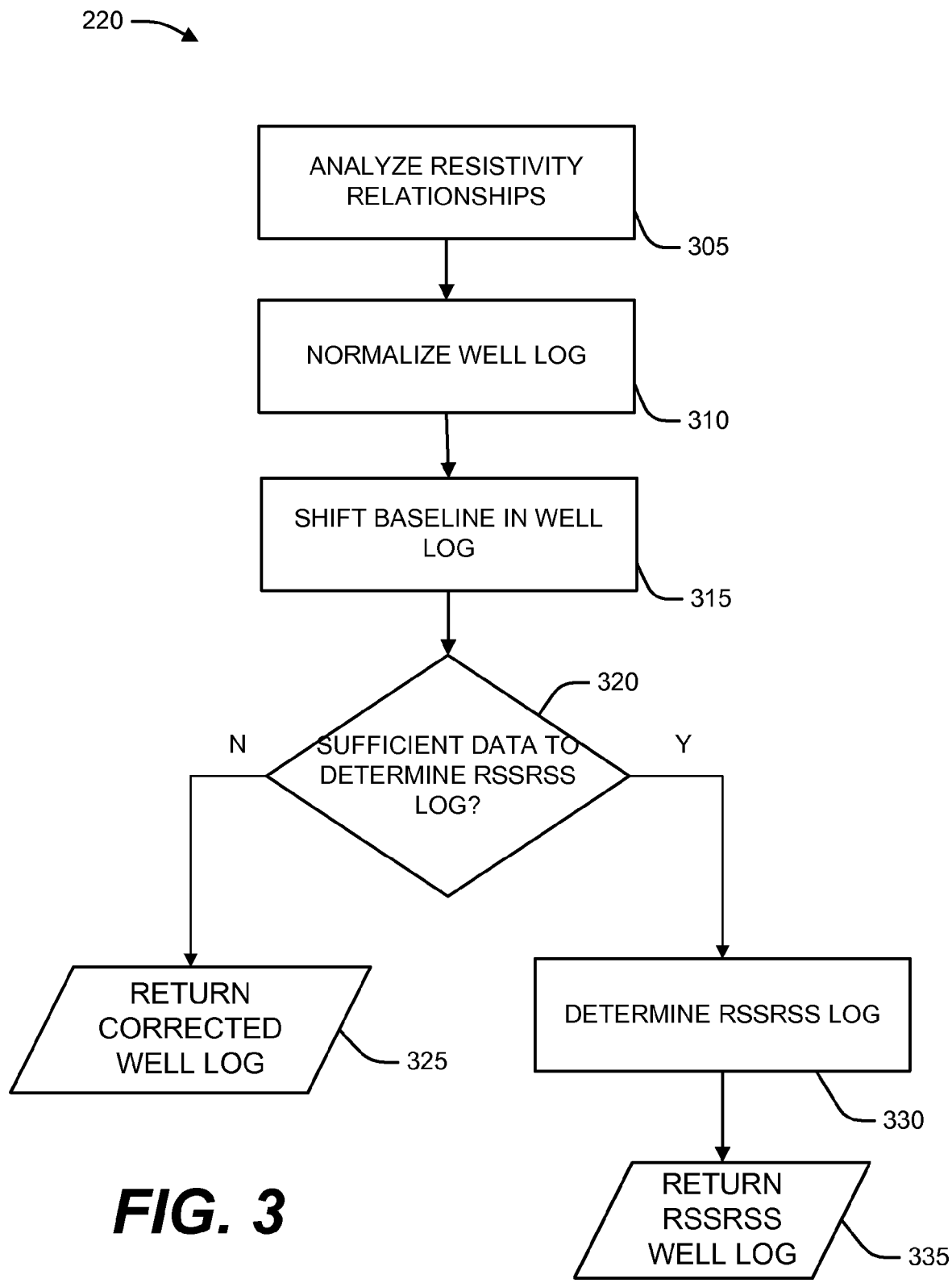

An example system for normalizing and shifting the baseline of a log (block 220) is shown in FIG. 3. The system analyzes resistivity relationships of the log (block 305). Certain example systems consider one or more relationships between one or more of $R_M$, $R_{MF}$, $R_W$, $R_{SH}$, and $R_T$. The system normalizes the well log (block 310). The system shifts the baseline in the well log (block 315). The system determines if there is sufficient data to determine a RSSRSS log from the well log (block 320). If there is insufficient data to determine a RSSRSS log the system returns the corrected well log (block 325). Otherwise the system determines and returns a RSSRSS log (block 330 and 335).

An example system for identifying facies units for one or more log locations (block 110) is shown in FIG. 4. The system identifies reservoir areas within enveloping depths (block 405). In some example systems the enveloping depth to look for reservoir areas is determined pragmatically based on the input data and zero or more other factors. In other example implementations, the operator specifies the enveloping depths. In still other implementations, the system may use default enveloping depths. In general, the system will note where the RSSRSS curve passes though the provisional RSSRSS cutoff value. Areas of the RSSRSS curve with values above the provisional RSSRSS cutoff value are designated as non-reservoir areas, while areas of the RSSRSS curve with values above the provisional RSSRSS cutoff value are designated as reservoir areas. The system analyzes the identified reservoir areas (block 410, which is shown in greater detail in FIG. 5).

Figure 5:
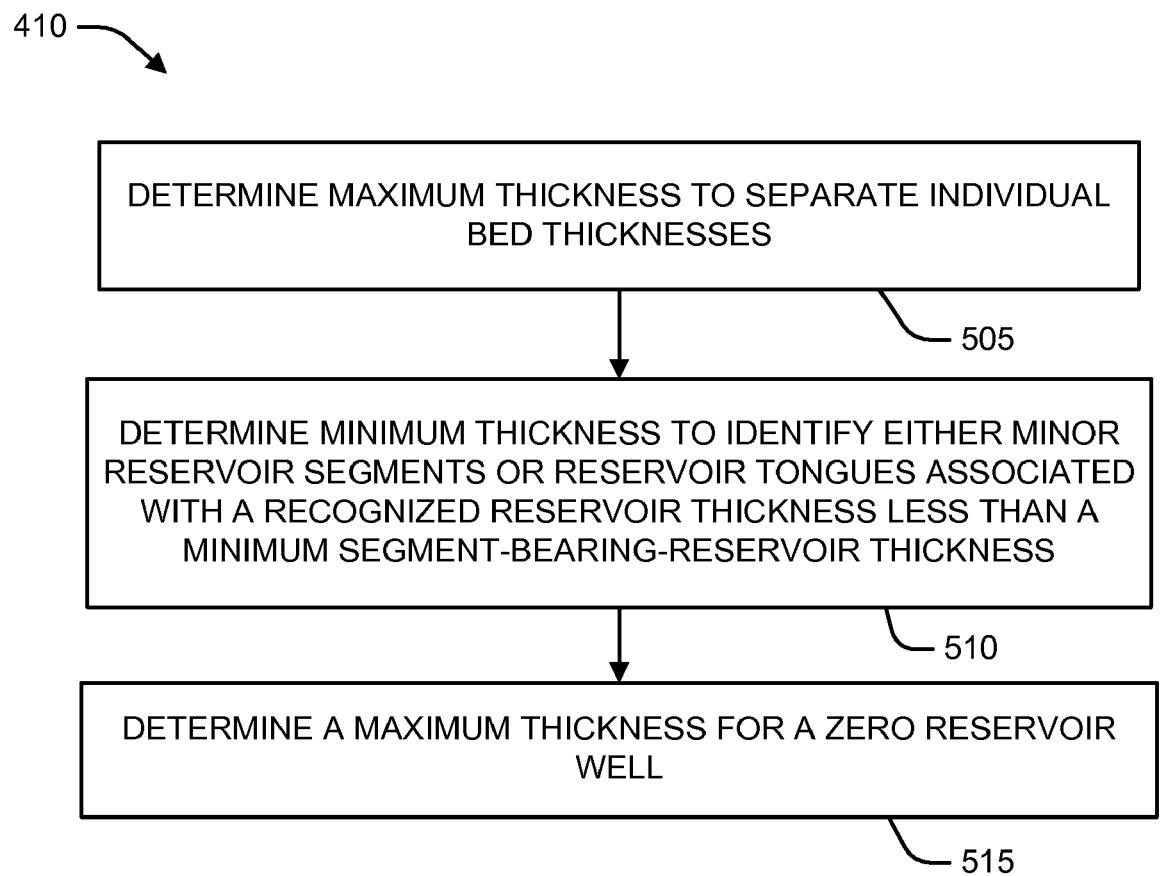

FIG. 5 shows an example system for analyzing identified reservoir areas (block 410). The system determines a maximum thickness to separate individual bed thicknesses (block 505). This value may be calculated by the system, it may be a default, or it may be at least partially controlled by an operator. The maximum thickness to separate individual bed thicknesses allows reservoirs with separated by a non-reservoir area with a thickness less than the maximum thickness to separate individual bed thicknesses to be treated as compound facies units.

The system determines a minimum thickness to identify either minor reservoir segments or reservoir tongues associated with a recognized reservoir thickness less than a minimum segment-bearing-reservoir thickness (block 510). In general, the system may treat certain reservoir beds with thickness less than a minimum reservoir thickness as non-facies units. In certain example implementations, it may treat these beds as resultants. The minimum thickness to identify either minor reservoir segments or reservoir tongues associated with a recognized reservoir thickness less than a minimum segment-bearing-reservoir thickness allows these thin beds that are within the maximum thickness to separate individual bed thicknesses as part of the facies unit of the larger bed. This minim thickness may be determined by the system, may be a default, or may be at least partially controlled by the operator.

The system then determines a maximum thickness for a zero reservoir well (block 515). This value may be calculated by the system, at least partially based on a default value, or may be at least partially controlled by the operator. In general, the system will treat a well where all of the reservoirs (or all of the reservoirs in some interval) that has a thickness less than the maximum thickness for a zero reservoir well as a zero reservoir well.

Returning to FIG. 4, the system determines zero reservoir wells (block 415). In one example system, this is based on the maximum thickness for a zero reservoir well determined in block 515. In some example implementations, the system may identify a segment of the well as a zero reservoir segment even if some other portion of the well includes reservoirs greater than the maximum thickness for a zero reservoir well.

The system groups identified reservoir areas into zero or more compound facies units (block 420). In some example system, this may be based on the distance between the reservoir areas and one or more of the minimum thickness to identify either minor reservoir segments or reservoir tongues associated with a recognized reservoir thickness less than a minimum segment-bearing-reservoir thickness and the maximum thickness to separate individual bed thicknesses, as described with respect to FIG. 5. Identified reservoir areas that are not grouped into compound facies units but that meet minimum thickness criteria units may be referred to as single facies units. In general, the term facies unit includes both compound facies units and single facies units.

Figure 6:
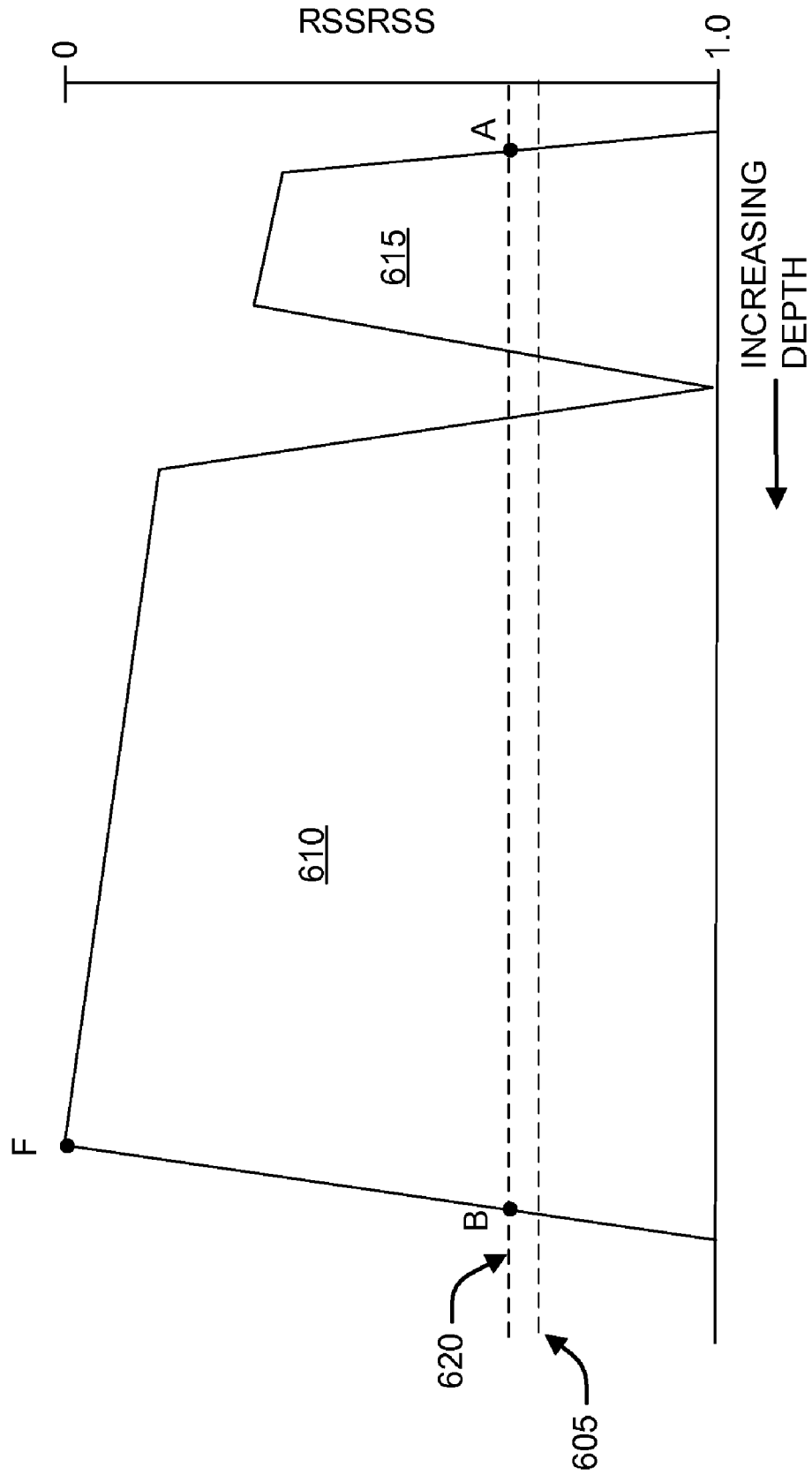

In block 425, the system determines a final bed boundary for one or more of the identified facies units. In one example system, the final bed boundary is determined by recognizing where the RSSRSS curve from the base of the facies unit achieves an inflection point. For example, the system may calculate a second derivative of the RSSRSS curve from the base of the facies unit and determine where it reaches an inflection point value. In one example implementation, the inflection point value is 0.66. Turning to FIG. 6, a simplified RSSRSS versus depth curve is presented. The line indicated by 605 is the provisional RSSRSS cutoff value. Areas where the RSSRSS curve is less than the provisional RSSRSS cutoff value are reservoir areas or beds. In FIG. 6, reservoir beds 610 and 615 are interrupted by a non-reservoir area. If the thickness of the non-reservoir bed between reservoir beds 610 and 615 is less than the maximum thickness to separate individual bed thicknesses, the system may treat the reservoir beds 610 and 615 as a compound facies unit. Line 620 represents the final RSSRSS cutoff value for the compound facies unit that includes reservoir beds 610 and 615. Point B represents the final base of the facies unit, point A represents the top of the facies unit, and point F represents the minimum RSSRSS value for the facies unit. Certain example implementations may use an averaged RSSRSS value to determine point F.

Figure 7:
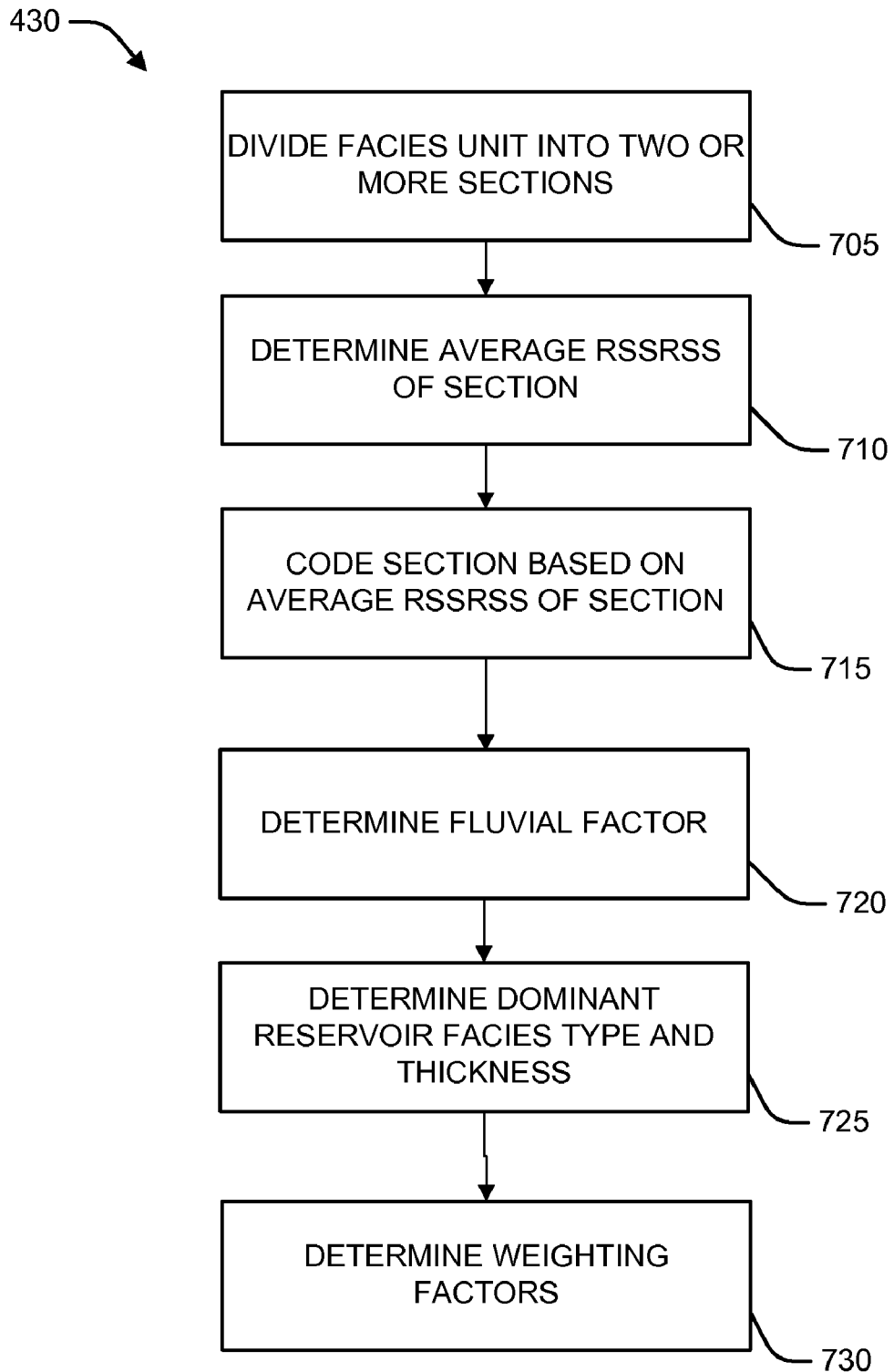

Returning to FIG. 4, the system determines the facies type of the identified facies units (block 430, which is shown in greater detail in FIG. 7). In some example systems, the facies type of the facies unit is determined by numerical analysis or other calculations. In other implementations, the facies type is determined, based at least in part on operator intervention. In still other implementations, the facies type is determined based on matching the facies unit to known facies units.

Figure 8:
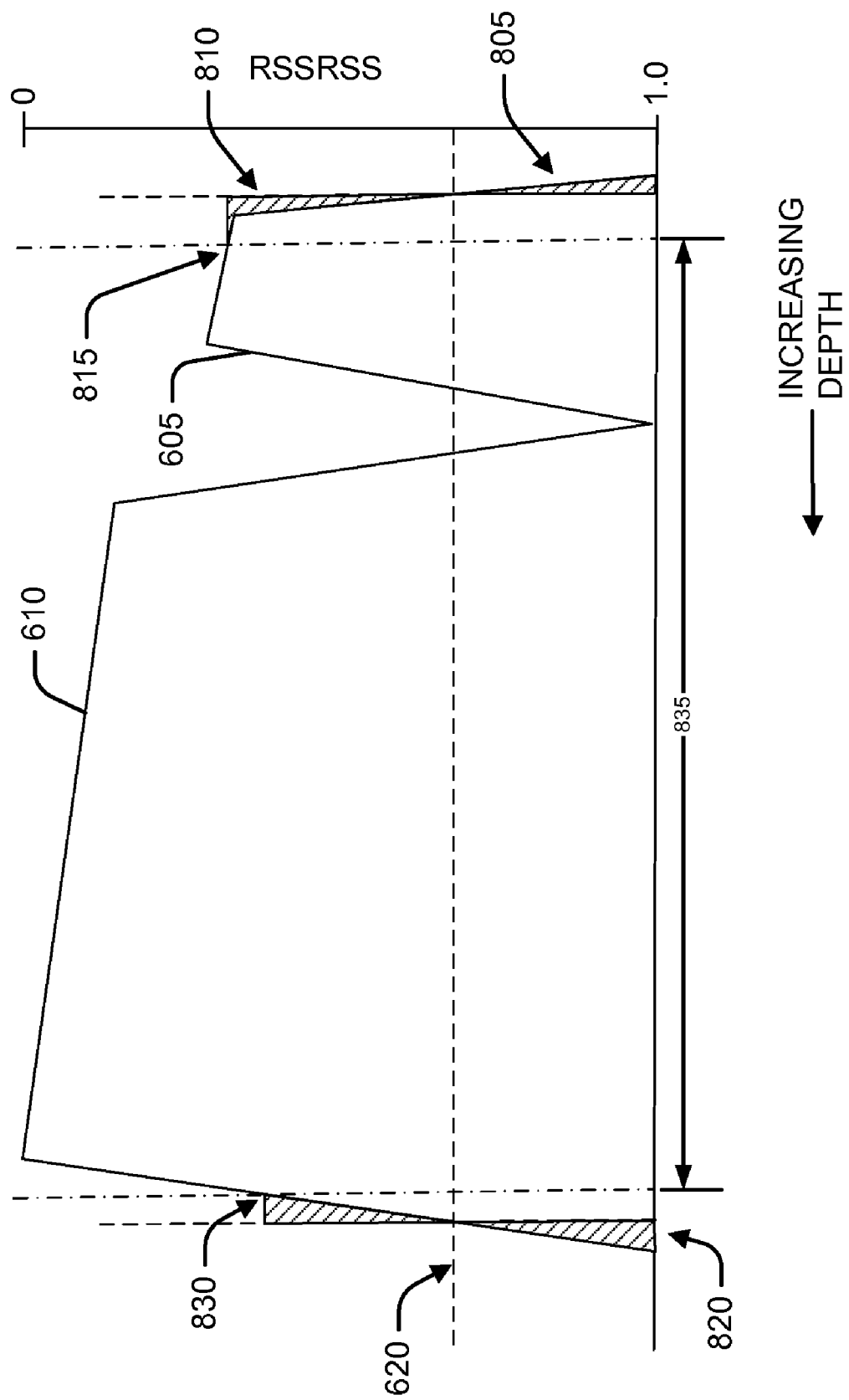

FIG. 7 is a flow chart showing an example method of determining the facies type of the identified facies units (block 430). The facies unit is divided into sections (block 705). In certain example implementations, the facies unit is modified to remove portions of the facies unit that should not be considered. These sections of the facies unit may have been introduced because the logging tool detected the RSSRSS curve that defines the facies unit, before actually reaching the depth where the facies unit begins. For example, turning to FIG. 8, the facies unit that includes reservoir beds 605 and 610 is shown. The system determines an area 805 that is bounded by: (1) a line drawn parallel to the RSSRSS axis through the intersection of the final RSSRSS cutoff line 620; (2) the depth axis; and (3) the RSSRSS curve of single facies unit 605. The system then fills an equal area in region 810 bounded by: (1) the line drawn parallel to the RSSRSS axis through the intersection of the final RSSRSS cutoff line 620 and (2) the RSSRSS curve of single facies unit 605. The system then determines point 815, which is the deepest point occupied by the area 810. The corrected top of facies unit is then defined by a line drawn parallel to the RSSRSS axis though point 815. A similar procedure is used to determine areas 820 and 825 and point 830. The corrected base of the facies unit is then defined by a line drawn parallel to the RSSRSS axis that runs though point 830. The corrected thickness of the facies unit is defined by interval 835. The division of the facies unit is performed by dividing the interval 835 into two or more sections.

Returning to FIG. 7, in certain implementations the facies unit may be divided into four sections of equal thickness. In other implementations, the facies unit may be divided into greater or fewer sections, which may have the same or different thicknesses. The system determines an average value of RSSRSS for the section (block 710) and assigns a code to the section based on the average RSSRSS value for the sections (block 715). In certain implementations, the system determines the facies type of the facies unit based on the codes assigned to each section. Possible facies types include, but are not limited to: conduits, couplets, resultants, mirror, prograde, and crevases. The system then determines a fluvial factor (FF) for the facies unit (block 720). The fluvial factor may also be referred to as the conduit factor. In one example implementations, the fluvial factor may be found using the equation:

$$FF = \frac{AF}{AB} \qquad \text{(Equation 2)}$$

where point A is a point at the final top of the fluvial unit, B is a point at the final base of the fluvial unit, and F is a point at the minimum RSSRSS for the fluvial unit, AB is the length of a line between points A and B, and AF is the length of a line between points A and F, as show in FIG. 6. In certain implementations, the fluvial factor may be used alone or with the coding described above to determine the facies type. In one example implementation, the facies is determined to be a conduit if the fluvial factor is greater than or equal to 0.70. In this example implementation, the facies is determined to be a resultant if the fluvial factor is less than 0.25. In this example implementation, if the fluvial factor is greater than or equal to 0.25, but less than 0.70, then the facies is determined to be a couplet, unless the facies factor is between 0.47 and 0.53, in which case the facies may be determined to be a mirror.

Returning to FIG. 7, the system determines the dominant facies type and thickness of the facies unit (block 725). Certain example embodiments may use the fluvial factor, described above to determine the dominant facies type of a facies unit. Other implementations may use a comparison of the areas of the various facies in the facies unit to determine the dominant facies type. The system determines at least one weighing factor for one or more facies units (block 730).

Figure 9:
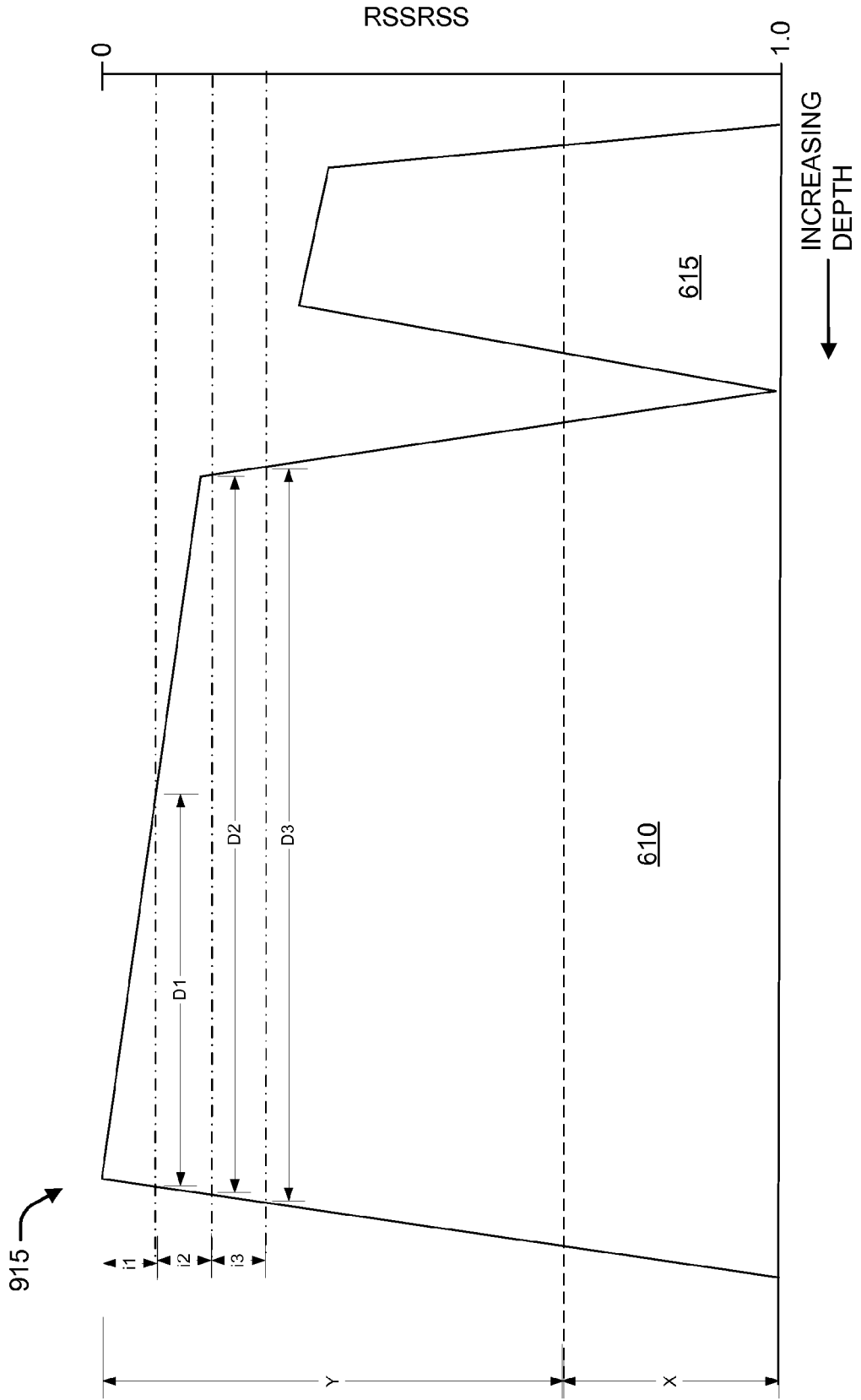

FIG. 9 shows the example facies unit that includes single facies units 610 and 615. The system may determine or more quality thicknesses. In the example shown in FIG. 7, the system determines three offsets (i1, i2, and i3) from the maximum RSSRSS value at which to measure facies unit thickness. In one example system, i1, i2, and i3 are equal and equal to 0.1. In another example system, i1, i2, and i3 are equal and equivalent to Y/5. Other example implementations may use more or less than three offsets at which to determine quality thicknesses D1, D2, and D3. Other implementations may also feature offsets that are not equally sized. Other implementations may also feature offset that are based on other computations or at least in part on operator input. In certain implementations, unlike the example shown in FIG. 9, one or more of the quality thicknesses may include portions of two or more reservoir beds. In that example, the individual quality thicknesses in each reservoir bed are added to determine a total quality thickness. In one example system, the weighing factor (R) is determined using the following formula:

$$R = (AB)(FF)\left[1 + \frac{D1}{AB} + \frac{D2}{AB} + \frac{D3}{AB}\right] \quad \text{(Equation 3)}$$

where AB is the length of the line between points A and B in FIG. 6, D1, D2, and D3 are the lengths of the thicknesses labeled in FIG. 9, and where the fluvial factor (FF) is a measure of the percentage of a facies unit that is occupied by conduit.

In another example system, the weighing factor is determined using the following equation:

$$R = (AB)(FF)\left[1 + \left(\frac{D1}{AB} \times \frac{D2}{AB} \times \frac{D3}{AB}\right)\right] \quad \text{(Equation 4)}$$

In other example systems, the weighing factor (R) is determined without using the fluvial factor. In another example system, the weighing factor is determined using the following equation:

$$R = (AB)\left[1 + \left(\frac{D1}{AB} + \frac{D2}{AB} + \frac{D3}{AB}\right)\right] \quad \text{(Equation 5)}$$

In another example system, the weighing factor is determined using the following equation:

$$R = (AB)\left[1 + \left(\frac{D1}{AB} \times \frac{D2}{AB} \times \frac{D3}{AB}\right)\right] \quad \text{(Equation 6)}$$

Figure 10:
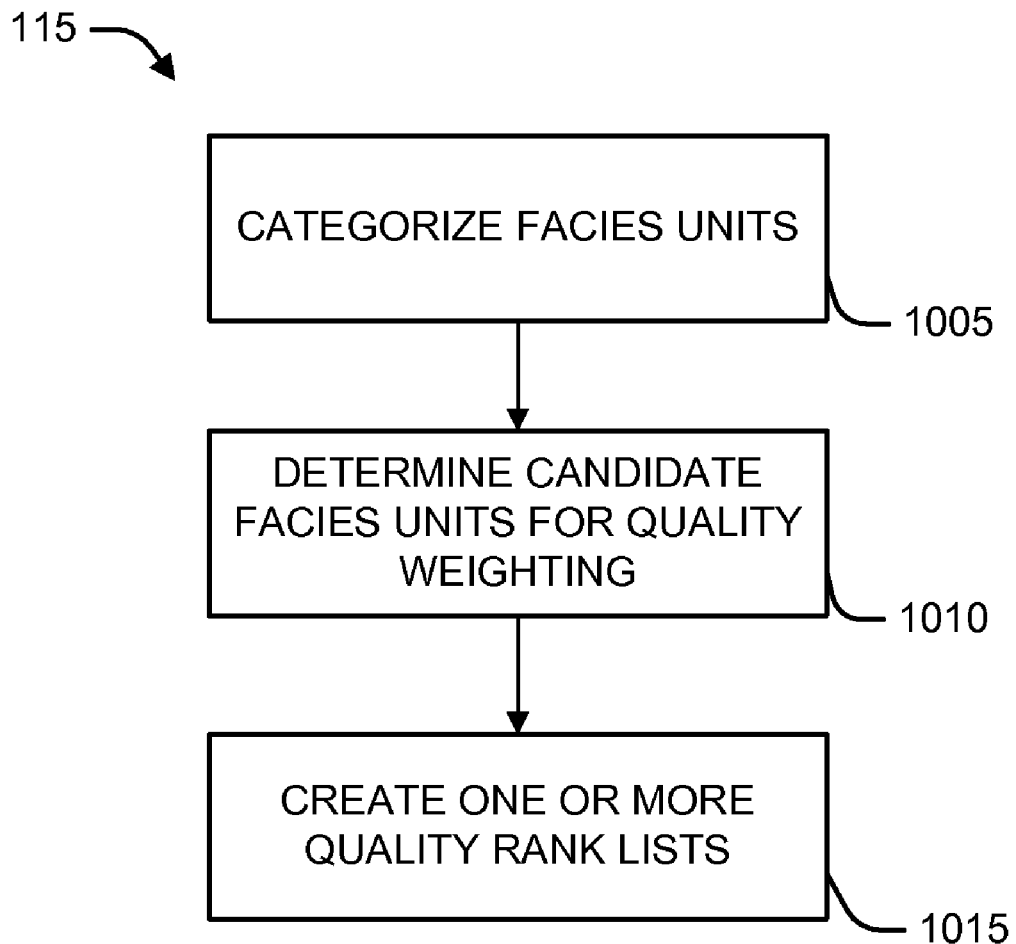
Figure 11:
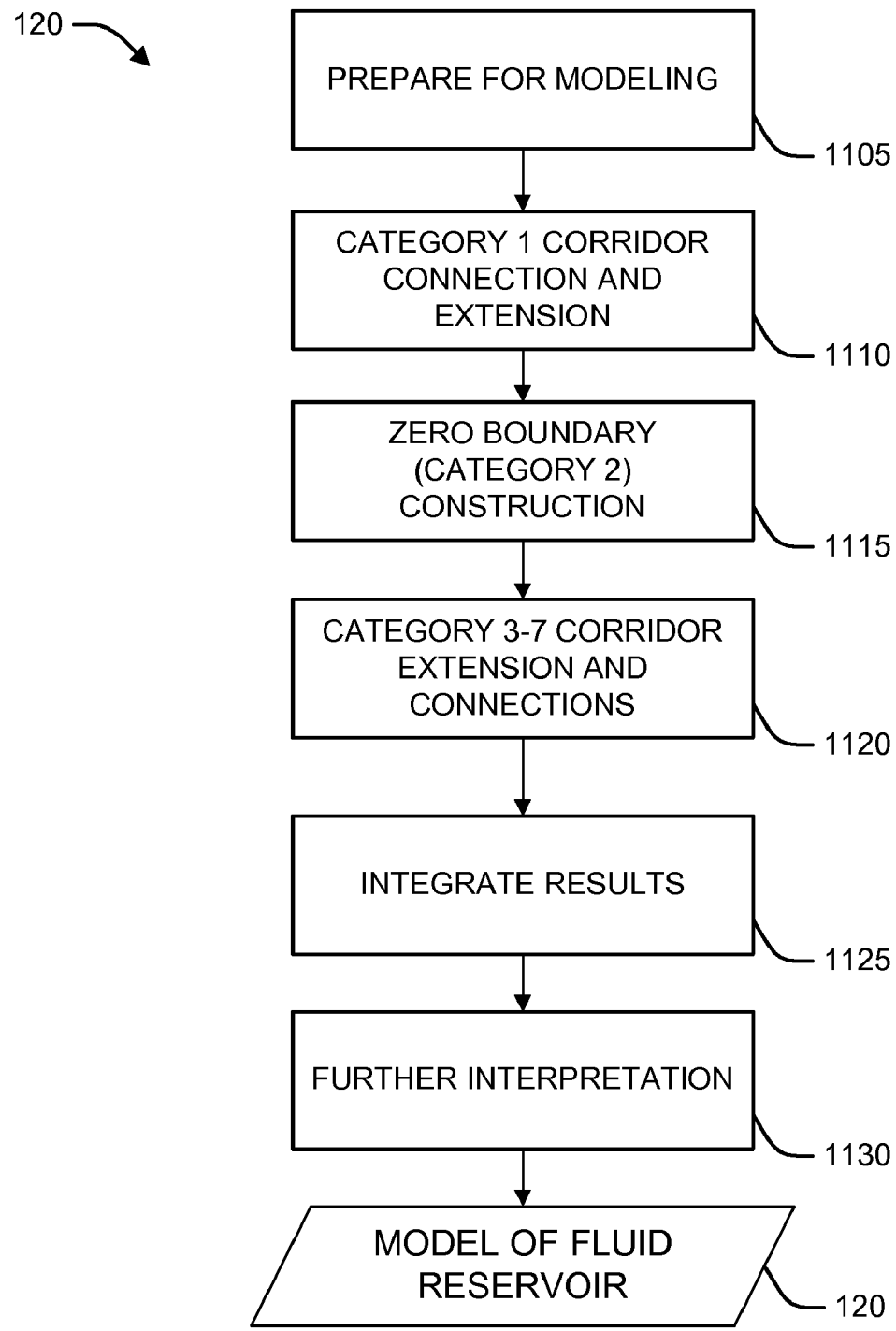

FIG. 10 is a flow chart of an example method of categorizing and ranking one or more of the identified facies units (block 115). The system categorizes the identified facies units (block 1005). The system determines zero or more candidates for quality weighing (block 1010). The system creates one or more quality rank lists.

In general, the categorization of the identified facies units (block 1005) is based on one or more of the thickness of the facies unit and the facies type of the facies unit. In certain example implementations the system may determine one or more of a minimum thickness and a maximum thickness for each category. In other example systems, the minimum thickness and a maximum thickness for each category may be operator controlled or set by default.

One example facies unit categorization method features seven possible categories for facies units. In one example implementation, category 1 includes facies units with thicknesses greater than a minimum category 1 thickness where the facies type is either conduit or mirror. In one example implementation the minimum category 1 thickness may be 20 feet.

In one example system, category 2 includes facies units with thicknesses less than a maximum category 2 thickness. Category 2 facies may be referred to as zero reservoir well facies units. In one example implementation, the maximum category 2 may be 1 foot.

In one example system, category 3 includes facies units with thicknesses greater than a minimum category 3 thickness, where the facies type is either resultant, prograde, or couplet. In one example implementation the minimum category 3 thickness may be 20 feet.

In one example system, category 4 includes facies units with thicknesses greater than a minimum category 4 thickness and less than a maximum category 4 thickness where the facies type is either conduit or mirror. In one example implementation the minimum category 4 thickness may be 20 feet and the maximum category 4 thickness may be 13 feet.

In one example system, category 5 includes facies units with thicknesses greater than a minimum category 5 thickness and less than a maximum category 5 thickness where the facies type is either conduit, prograde, or couplet. In one example implementation the minimum category 5 thickness may be 20 feet and the maximum category 4 thickness may be 13 feet.

In one example system, category 6 includes facies units with thicknesses greater than a minimum category 6 thickness and less than a maximum category 6 thickness where the facies type is either crevasse or mirror. In one example implementation the minimum category 6 thickness may be 20 feet and the maximum category 4 thickness may be 13 feet.

In one example system, category 7 includes facies units not otherwise categorized. Other example systems may have more or fewer categories and different criteria for assigning facies units to categories. In particular, certain example systems may determine one or more thicknesses to use during categorization using one or more statistical representations of the thicknesses of facies units in one or more wells. Certain example systems determine one or more of the following:
  a histogram of the frequency distribution of the thicknesses;
  a histogram of relative thicknesses;
  a cumulative curve of relative frequency of the thicknesses;
  a mean of the thicknesses;
 a median of the thicknesses;
  a mode of the thicknesses;
  a variation of the thicknesses; and
  a standard deviation of the thicknesses.

The system may further perform a modal analysis of the thickness. In certain example systems, a bimodal distribution of thicknesses will be recognized and the system will tend to determine the critical thickness toward or within the higher mode. Based on one or more of the statistical analyses, the example system determines one or more thicknesses for classifying facies units. In some example systems, the statistical analysis of the factors discussed above may be used to determine other values, such as RSSRSS cutoff values for reservoir beds.

In certain example implementations of block 1010, the system chooses to rank one or more facies units in certain categories. For example, the system may only rank category 1 facies units. In another example, the system may only rank category facies, from wells where $R_M/R_W$ is greater than or equal to 3. In some implementations, the ranking is based on adding R (determined in block 730) to the thickness of the facies units. Other implementations may multiply by the weighing factor. In certain implementations, R is not determined for a facies unit until it is determined to be a candidate for quality weighing.

Returning to FIG. 1, the system connects facies units between wells to create a model of the fluid reservoir (block 120). An example system of connecting lithographic features between wells to create the model is shown in FIG. 30. The system prepares for modeling (block 1105, which is shown in greater detail in FIG. 12). The system performs category one corridor connection and extension (block 1110, which is shown in greater detail in FIG. 13). The system constructs one or more zero boundaries (block 1115). The system performs category 3-7 one facies connection and extension (block 1120). The system integrates the results of the previous blocks (block 1125). Some example systems may integrate results periodically during one or more of blocks 1110-1120. The system performs further interpretation (block 1130), and returns the model of the fluid reservoir (block 120).

Figure 12:
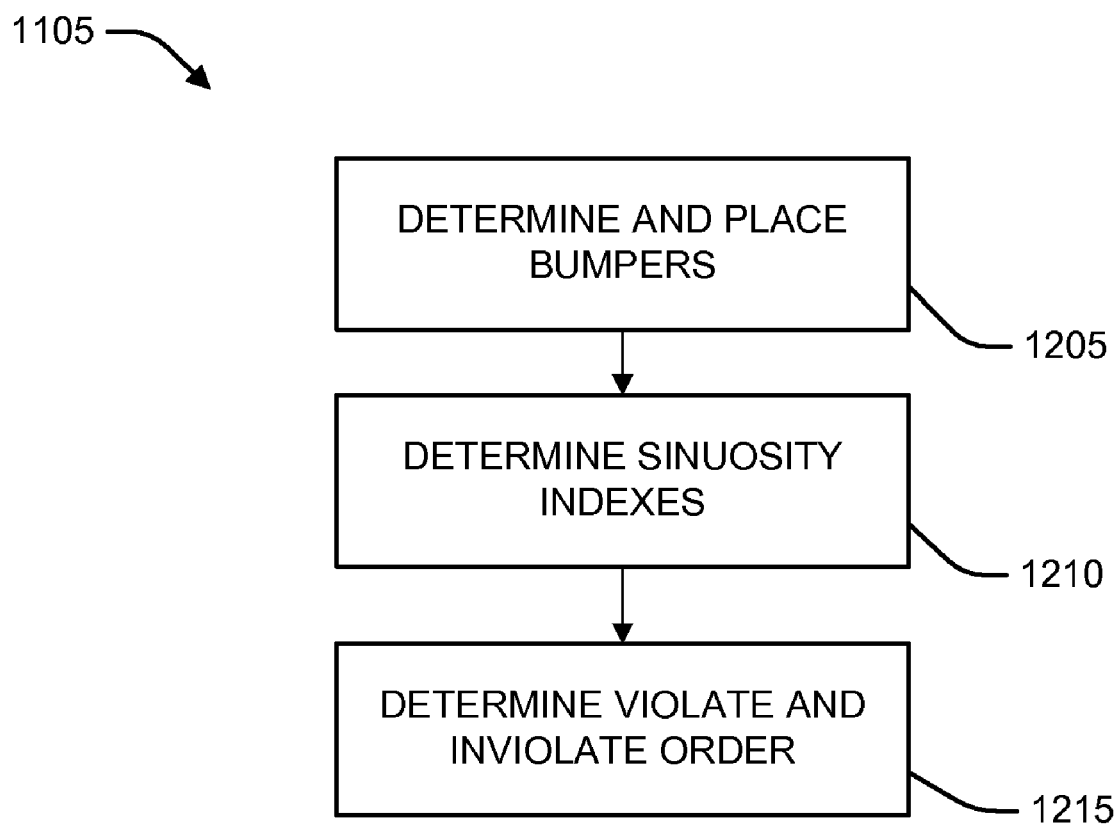

An example system for preparing for modeling (block 1105) is shown in FIG. 12. The system determines the size and places on or more bumpers around one or more wells (block 1205). One example system determines the diameter of bumpers to place around wells by the thickness of one or more facies units in the well. The example system plots the bumpers as circles around wells with conduits of a certain thickness. In one example system, only category one reservoirs are given bumpers. The system determines a sinuosity index (block 1210). In one example system, the sinuosity index is the amount of bending that corridors between two wells may perform. In certain implementations, it may be measured as one or more angles based on the corridor passing though a bumper. In some example systems, the maximum sinuosity index of corridors may change during the course of modeling the fluid reservoir. The system determines a violate and inviolate order (block 1215). The inviolate order specifies which modeling steps must take place before others under all circumstances, while the violate order may be altered based on one or more circumstances.

Figure 14:
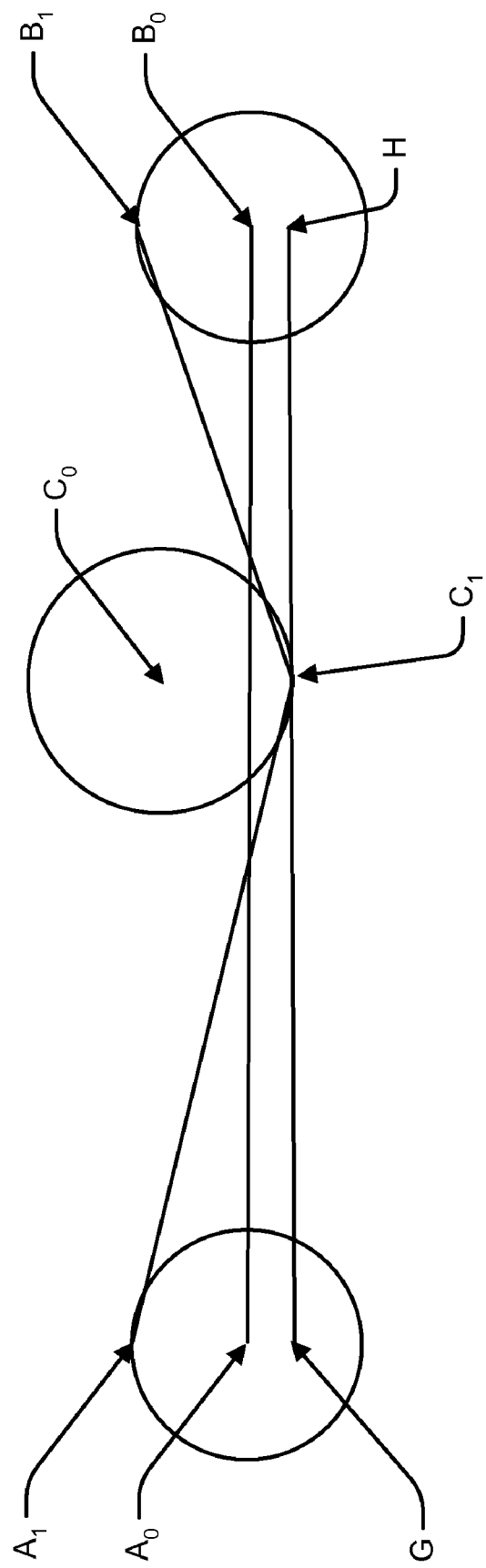
FIG. 14 illustrates bumpers around three wells.

FIG. 14 shows three example wells designated as $A_0$, $B_0$, and $C_0$. The bumpers of $A_0$, $B_0$, and $C_0$ extend to $A_1$, $B_1$, and $C_1$, respectively. The sinuosity index of the corridor from $A_0$ to $B_0$ is the sine of the angle $A_1C_1G$, where line HG is a line tangential to the bumper around $C_0$ parallel to the corridor from $A_0$ to $B_0$. The sinuosity index of the corridor from $B_0$ to $A_0$ is the sine of the angle $B_1C_1H$. In some example systems, both of these sinuosity indexes must be less than the chosen sinuosity index for the corridor to be permitted. In one example implementation, the default chosen sinuosity index is about 0.58.

Figure 13:
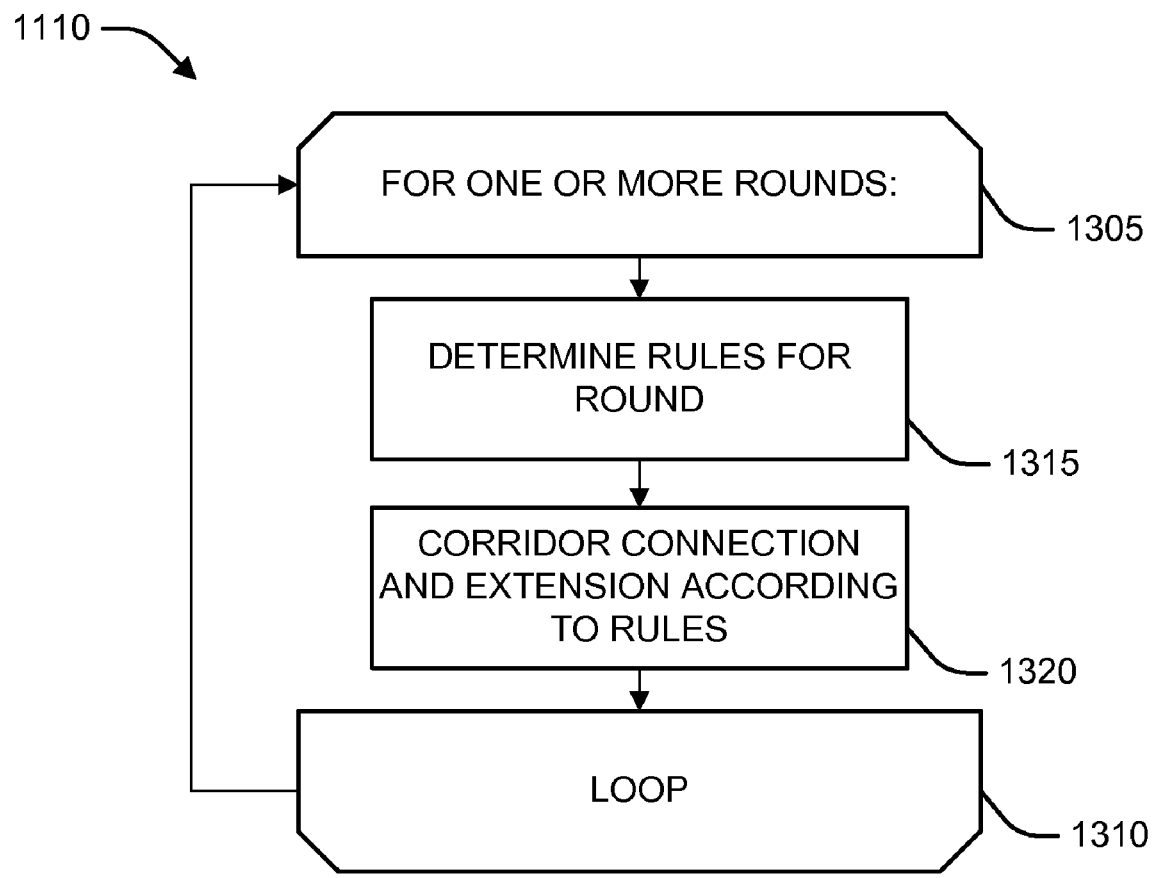

An example system for performing corridor connection and extension is shown in FIG. 13. The system loops once for one or more rounds of extension and connection (block 1305 and 1310). Within the loop, the system determines the rule set for the round (block 1315), and performs the connections and extension according to the rules (block 1320).

In some example implementations, the system performs category 3-7 one facies connection and extension (block 1120), using the system shown in FIG. 13. In one example system, the category 3-7 connections and extension may be category-by-category. In other example implementations, two or more of the categories may be grouped together during connection and extension.

The rule set for each round of connection and extension may vary based on the needs of the system. In one example system, in the first round of category one well connection and extension the rules are stringent. For example, the connection between the wells may not be longer than half the width of the entire field. Another example rule is that the connection must be unimpeded and may not be closer than a distance from a well. For example, in some example rounds the connections may not be within eighty feet of a well. Another example rule is that the connection cannot be made that will be cross a previous connection.

Another example rule is that if a potential connections penetrates one intermediate bumper lying between ranked fluvial bumpers (wells with fluvial reservoirs), the connection is only allowed if the sinuosity index is less than or equal to a cutoff sinuosity index. In one example round the sinuosity index is about 0.58. Another example rule is that a connection may only pass though a bumper a maximum number of times, regardless of the sinuosity index. In one example system, the maximum number of times is one.

Another example rule is that a connection cannot be made if the connection is tightly bracketed between two opposing intervening bumpers so that the protracted corridor width cannot clear between the bumpers. In general, the protracted corridor width is defined by straight lines that are either tangential to opposing sides of a bumper or lines that connect to the ends of a bumper diameter that is perpendicular to the connecting corridor length between two wells.

Another example rule for connecting and extending corridors between wells is that a segment extension begins at the center of a rank bumper and that extension in a round always proceed from a higher rank (i.e. smaller number on the rank list) to a lower rank.

Another example rule is that from a well with a rank, an initial connection or initial connection may only be made with wells with a rank within a rank range of the bumper. For example, in one round the initial connection or connections must be made to wells with ranks within five of the well where the connection originates.

Another example rule is that if an initial connection is made between two wells, then additional connections should be attempted from the last well (i.e., the destination well of the connection) to a well within the rank interval of the last well. In one example round, this range interval is five.

One or more of the rules help to model the fluid reservoir as a self-similar system. For example, rivers which form fluvial clastic formations generally behave according to self-similar properties. For example, the flow of water tends to split as the volume and speed of the water decreases. Conversely, the flow of water tends to combine as the volume of water carried increases. An example rule based on this self-similarity is that divisions (i.e., multiple connections from one well) are allowed if earlier division rules are followed. Each division proceeds as its own set of connections.

Another example rule is that once a division is stated, it and any further divisions of it must proceed until they are stymied. In general a stymied well is one from which a connection cannot be made with any other well in the round. If a well is isolated with no connections two or from it, it is referred to as an isolated bumper. If a well is connected to, but cannot connect to any other well it is referred to as an end well.

Another example rule is that if the bumpers of two or more wells overlap forming a halo area, then no connections may be made across the halo area.

Another example rule is that a connection cannot be made though a bumper of a split or CV multiple bed bumper.

Another example rule is that a connection cannot be made if the connection would be bracketed by zero points within the width extension corridor. The creation of the zero boundary will be discussed with respect to block 1115.

Another example rule is that a connection cannot be made into or across a general area of zeros values. In one example system, a general area of zero values is defined as some number of zero values lying laterally on either side of the potentially projected line between the wells. In one example round the general area of zero values is two or more values that lie laterally on either side of the potentially projected line between the wells.

Another example rule is that the connection and extension round stats at a top ranked well though a stop rank well. In one example round the top ranked well is the rank one well and the stop rank well is the well with rank thirty-six. In one example round, when a ranked well is stymied or used an interior member of a multi-segment extension, the well is identified as inactive and retired from the rank list. In one example round, when the connection and extension is stymied at the end of a chain of wells (i.e., multiple connections involving three or more wells) or if the well is isolated, then the connection and extension procedure goes to the highest ranked bumper and initiates the procedure again. In one example system, this continues until there is only one well left.

Figure 15:
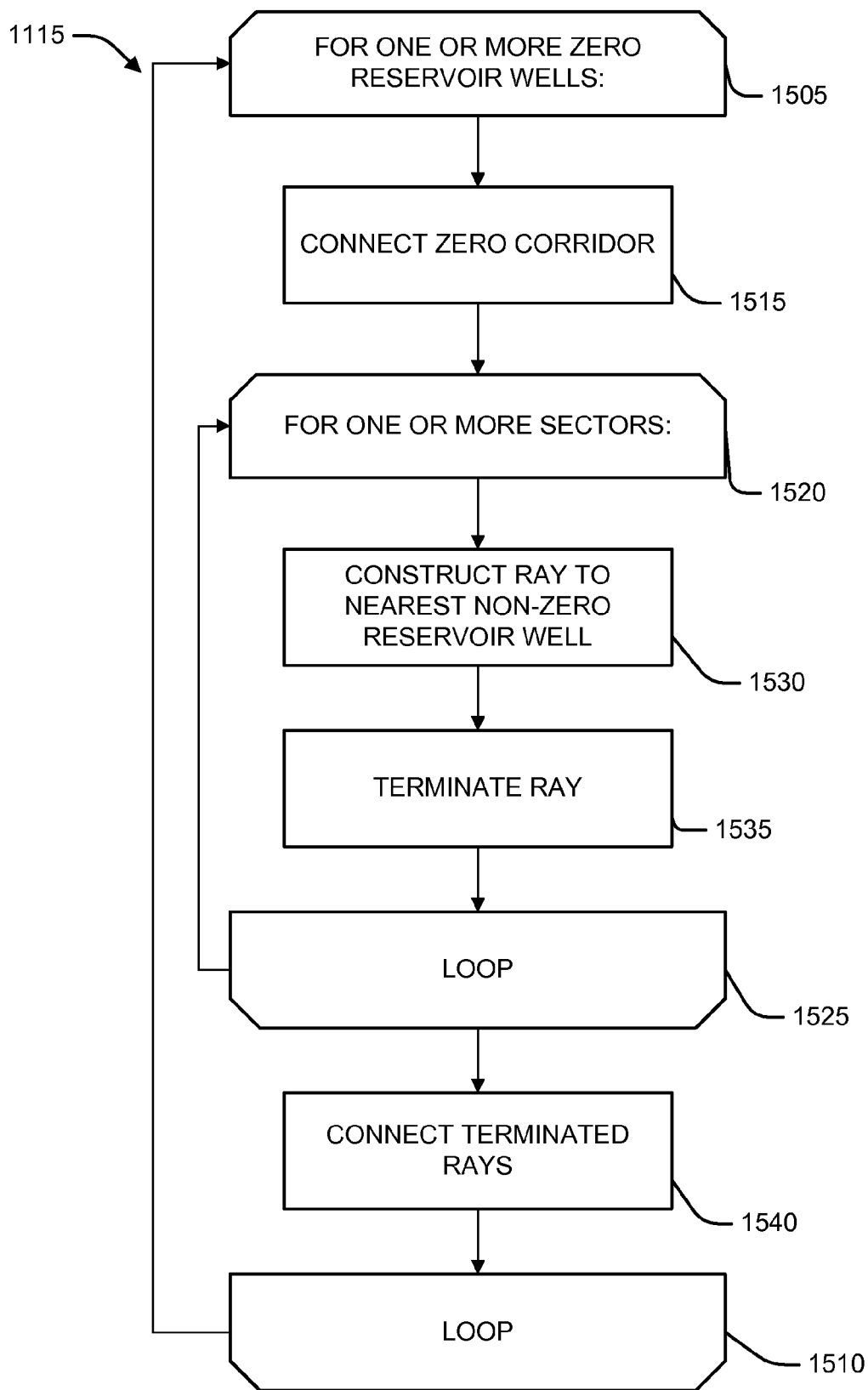
Figure 16:
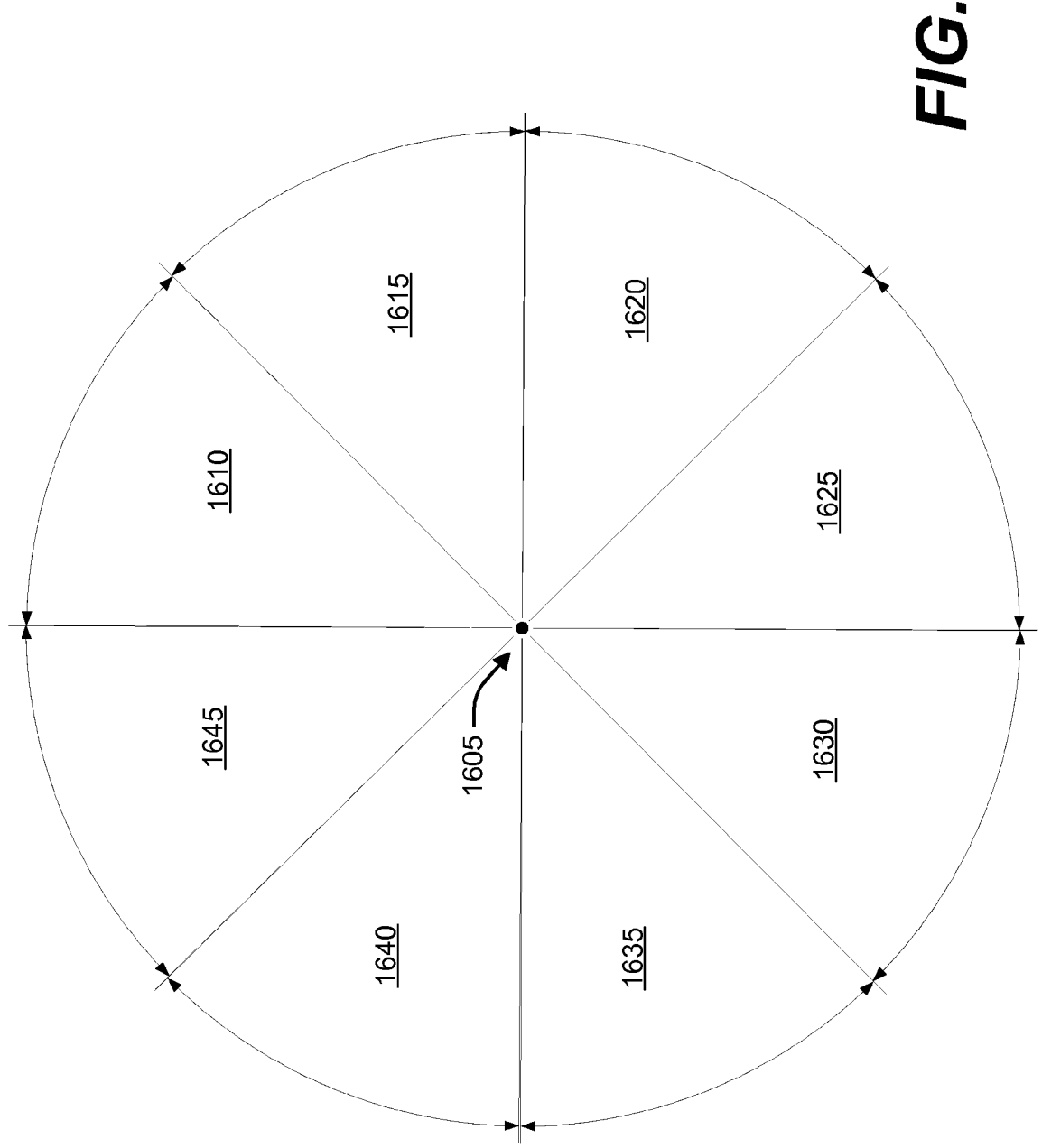
FIG. 16 illustrates sectors around a zero-reservoir well.

The zero boundary construction (block 1115) follows a set of rules, like the category one corridor connection and extension. The zero boundary construction, however, is based on zero reservoir wells instead of category one wells. An example system for construction the zero boundary (block 1115) is shown in FIG. 15. The system loops once for one or more zero-reservoir wells (block 1505 and 1510). The system connects a zero corridor (i.e., a corridor between zero reservoir wells) according to one or more rules (block 1515). The system enters a loop for one or more sectors about the zero well (blocks 1520 and 1525). As shown in FIG. 16, the region around a zero well may be divided into one or more sectors. For example, the zero well 1605 has octants 1610-1645 about it. Within the sector, the system constructs a ray to the nearest non-zero reservoir well (block 1630) and terminates the ray at a point (block 1635). The system connects the terminated rays to define a zero boundary region.

Figure 17:
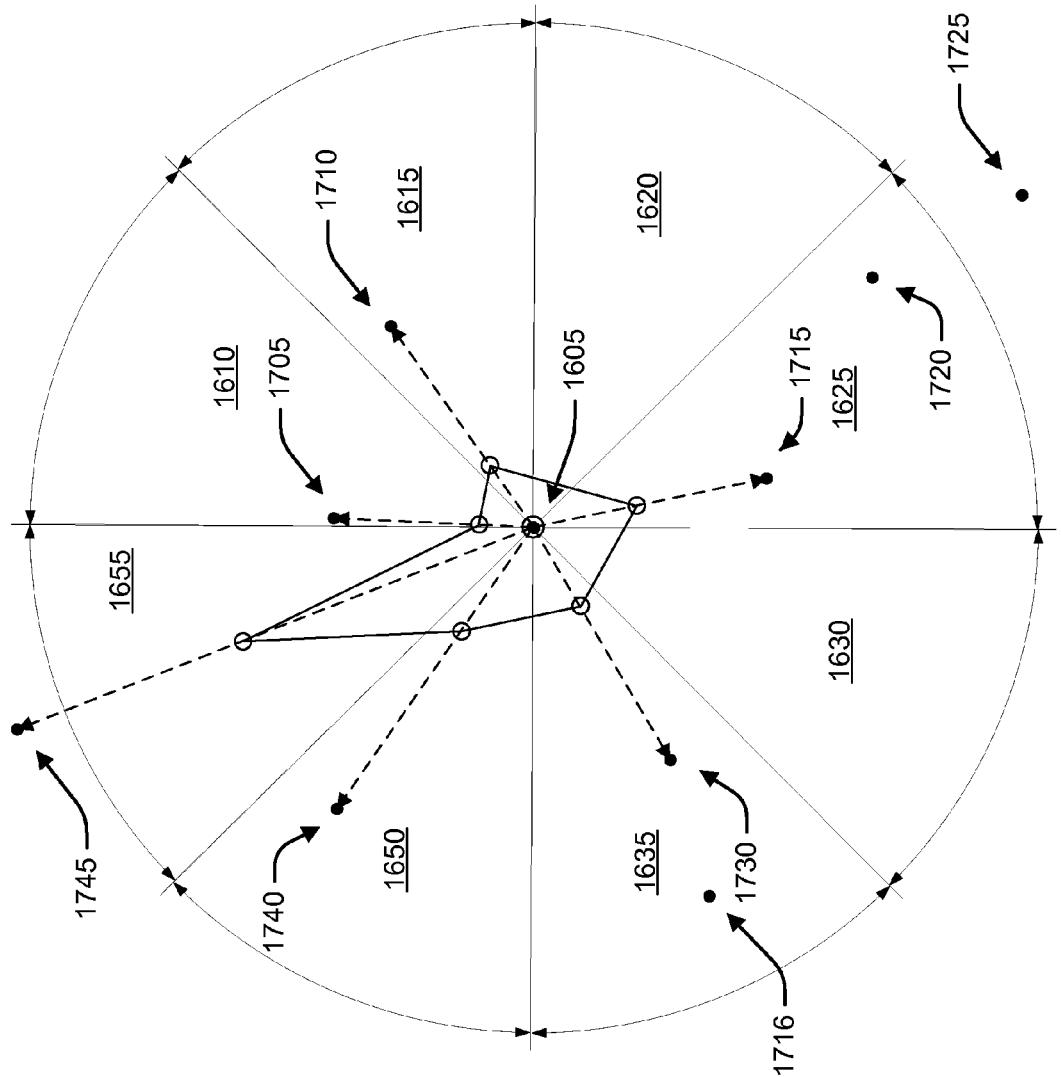
FIG. 17 illustrates the formation of a zero boundary.

An example of the zero boundary construction is shown in FIG. 17. The rays are drawn from the zero reservoir well 1605 to non-zero reservoir wells 1705, 1710, 1715, 1730, 1740, and 1745, as they are the closest non-zero reservoirs wells in their respective sectors. There are no non-zero reservoirs in sectors 1620 and 1630, so no rays were drawn in those sectors. Each of the rays is terminated (block 1535) at a point shown by the open circle along the ray. The determination of where to terminate the line may be based on one more factors. In one example system, the ray is terminated at 0.293 of the length of the ray from the zero reservoir well. In other example systems, the determination of where to terminate the ray may be based at least in part on computation or at least in part on operator intervention. The zero reservoir is closed between the terminated ray points (block 1540). In certain example implementations, there may be more sectors without wells to draw rays to and the zero boundary closes back to the zero reservoir well. In other example implementations, the zero boundary may close onto an existing zero boundary line or to a corridor between zero-reservoir wells.

In certain implementations, where the are a group of zero reservoirs, the zero boundary construction starts at a zero reservoir well that this generally near the center of the group of zero reservoir wells and proceeds though the zero reservoir wells in an expanding clockwise manner. For example, the method may progress from the closes interior zero reservoir well by a measurement from the Area of Influence center and may select the zero reservoir well in the interior of the Area of Influence of the zero boundary. In certain implementations, when analyzing a particular octant the system may treat a zero-bound trace salient that penetrates the area of present interpretation as a data point.

In another example implementation of zero-boundary construction, if a second data value chosen is less than the data minimum and there is a third but more distant value, then one example system will use the third data value. If, however, there are only two data values, then the system may use the second data point even if it is less than a minimum distance from the zero reservoir well.

In another example implementation of zero-boundary construction, if a ray from a previous zero reservoir well lays substantially sub-parallel to a ray from a subsequent by adjacent zero reservoir well and both are in generally overlapping octants then both cutoff values may be used if there is a second cutoff that advances the zero boundary toward termination. In another example implementation of zero-boundary construction, zero axles may cross to solve zero boundary continuity.

The system for modeling reservoirs or any portion of the system may be implemented in software, hardware, or any combination of software and hardware. The system for modeling reservoirs may be suited to modeling fluvial deltaic caustic reservoirs, due to their self-similarity. The system may be used to determine locations for drilling fluid extraction wells.

The present invention is therefore well-adapted to carry out the objects and attain the ends mentioned, as well as those that are inherent therein. While the invention has been depicted, described, and is defined by references to examples of the invention, such a reference does not imply a limitation on the invention, and no such limitation is to be inferred. The invention is capable of considerable modification, alteration and equivalents in form and function, as will occur to those ordinarily skilled in the art having the benefit of this disclosure. The depicted and described examples are not exhaustive of the invention. Consequently, the invention is intended to be limited only by the spirit and scope of the appended claims, giving full cognizance to equivalents in all respects.

What is claimed is:

1. A method of modeling one or more reservoirs using one or more well logs, each for a well at a location and each including one or more Relative amount of Small Size Range of the Size Spectrum of Clastic Particles (RSSRSS) values versus depth, the method including:

for one or more well logs:
identifying one or more facies units based on RSSRSS values;
determining a thickness of one or more facies units; and
determining a facies type of one or more facies units;
categorizing one or more facies units; and
connecting one or more facies units to create a reservoir model.

2. The method of claim 1, where determining the facies type of one or more facies units includes:

dividing one or more reservoirs into one or more sections; and for one or more sections:
  determining the average RSSRSS of the section; and
  determining the facies type of the facies unit based, at least in part, on the average RSSRSS of one or more of the sections.

3. The method of claim 1, where identifying one or more facies units based on RSSRSS values includes:
  identifying one or more compound facies units, where each compound facies units includes at least two reservoir beds separated by a non-reservoir area with a thickness that is less than a maximum thickness to separate individual bed thicknesses.

4. The method of claim 1, where identifying one or more facies units based on RSSRSS values includes:
  determining a first cutoff RSSRSS value indicative of a reservoir bed boundary, where first cutoff RSSRSS value is based at least in part on one or more of one or more of the a resistivity of the mud ($R_M$), a resistivity of the mud filtrate ($R_{MF}$), and a resistance of permeable reservoir deposit connate water ($R_W$), a resistance of confining or surrounding shale or SSRSS for a well ($R_{SH}$), and a resistance of uninvaded permeable reservoir deposits ($R_T$).

5. The method of claim 1, where identifying one or more facies units based on RSSRSS values includes:
  determining a second cutoff RSSRSS value based, at least in part, on an inflection point of the RSSRSS curve for a facies unit.

6. The method of claim 1, where identifying one or more facies units based on RSSRSS values includes:
  identifying one or more compound facies units, where each compound facies units includes at least two reservoir beds separated by a non-reservoir area with a thickness that is less than a maximum thickness to separate individual bed thicknesses,
  projecting bumpers around one or more wells; and
  for one or more rounds.

7. The method of claim 1, further including:
  determining at least one zero boundary region about a zero reservoir well.

8. The method of claim 7, where determining at least one zero boundary region about a zero reservoir well includes:
  connecting two or more zero-reservoir wells to create a zero corridor.

9. The method of claim 7, where determining at least one zero boundary region about a zero reservoir well includes:
  for one or more zero-reservoir wells:
    constructing a ray to a non zero-reservoir well; and
    terminating the ray at a zero point; and
  connecting one or more zero points.

10. The method of claim 1, where connecting one or more facies units to create a reservoir model includes:
  projecting bumpers around one or more wells;
  for one or more rounds:
    connecting one or more facies units according to a rule set.

11. The method of claim 10, where the rule set includes:
  a maximum sinuosity for a connection between wells.

12. The method of claim 10, where the rule set is to model a self-similar system.

13. The method of claim 1, further comprising:
  ranking one or more facies units for at least one classification of facies units.

14. The method of claim 12, where connecting one or more facies units to create a reservoir model includes:
  connecting one or more facies units based, at least in part, on a ranking of one or more facies units.

15. A computer program, stored in a non-transitory computer readable storage medium, for modeling one or more fluid reservoirs using one or more well logs, each for a well at a location and each including one or more Relative amount of Small Size Range of the Size Spectrum of Clastic Particles (RSSRSS) values versus depth, the computer program including executable instructions that cause at least one processor to:
  for one or more well logs:
    identify one or more facies units based on RSSRSS values;
    determine a thickness of one or more facies units; and
    determine a facies type of one or more facies units;
  categorize one or more facies units; and
  connect one or more facies units to create a reservoir model.

16. The computer program of claim 15, where the executable instructions that case at least one processor to determine the facies type of one or more facies units, further causes the at least one processor to:
  divide one or more reservoirs into one or more sections; and
  for one or more sections:
    determine the average RSSRSS of the section; and
    determine the facies type of the facies unit based, at least in part, on the average RSSRSS of one or more of the sections.

17. The computer program of claim 15, where the executable instructions that cause the at least one processor to identify one or more facies units based on RSSRSS values further causes the at least one processor to:
  identify one or more compound facies units, where each compound facies units includes at least two reservoir beds separated by a non-reservoir area with a thickness that is less than a maximum thickness to separate individual bed thicknesses.

18. The computer program of claim 15, where the executable instructions that cause the at least one processor to identify one or more facies units based on RSSRSS values further causes the at least one processor to:
  determine a first cutoff RSSRSS value indicative of a reservoir bed boundary, where first cutoff RSSRSS value is based at least in part on one or more of one or more of the a resistivity of the mud ($R_M$), a resistivity of the mud filtrate ($R_{MF}$), and a resistance of permeable reservoir deposit connate water ($R_W$), a resistance of confining or surrounding shale or SSRSS for a well ($R_{SH}$), and a resistance of uninvaded permeable reservoir deposits ($R_T$).

19. The computer program of claim 15, where the executable instructions that cause the at least one processor to identify one or more facies units based on RSSRSS values further causes the at least one processor to:
  determine a second cutoff RSSRSS value based, at least in part, on an inflection point of the RSSRSS curve for a facies unit.

20. The computer program of claim 15, where the executable instructions that cause the at least one processor to identify one or more facies units based on RSSRSS values further causes the at least one processor to:
  identify one or more compound facies units, where each compound facies unit includes at least two reservoir beds separated by a non-reservoir area with a thickness that is less than a maximum thickness to separate individual bed thicknesses.

21. The computer program of claim 15, further including: determine at least one zero boundary region about a zero reservoir well.

22. The computer program of claim 21, where the executable instructions that cause the at least one processor to determine at least one zero boundary region about a zero reservoir well further causes the at least one processor to:
connect two or more zero-reservoir wells to create a zero corridor.

23. The computer program of claim 21, where the executable instructions that cause the at least one processor to determine at least one zero boundary region about a zero reservoir well further cause the at least one processor to:
for one or more zero-reservoir wells:
construct a ray to a non zero-reservoir well; and
terminate the ray at a zero point; and
connect one or more zero points.

24. The computer program of claim 15, where the executable instructions that cause the at least one processor to connect one or more facies units to create a reservoir model further cause the at least one processor to:
project bumpers around one or more wells;
for one or more rounds:
connect one or more facies units according to a rule set.

25. The computer program of claim 24, where the rule set includes:
a maximum sinuosity for a connection between wells.

26. The computer program of claim 24, where the rule set is to model a self-similar system.

27. The computer program of claim 15, further comprising executable instructions that cause the at least one processor to:
rank one or more facies units for at least one classification of facies units.

28. The computer program of claim 27, where the executable instructions that cause the at least one processor to connect one or more facies units to create a reservoir model further cause the at least one processor to:
connect one or more facies units based, at least in part, on a ranking of one or more facies units.

29. An information handling system including:
one or more controllers;
one or more data storage facilities, each of the one or more controllers providing access to one or more data storage facilities; and
a process for execution on one or more of the controllers for modeling one or more fluid reservoirs using one or more well logs, each for a well at a location and each including one or more Relative amount of Small Size Range of the Size Spectrum of Clastic Particles (RSSRSS) values versus depth, the process including:
for one or more well logs:
identifying one or more facies units based on RSSRSS values;
determining a thickness of one or more facies units; and
determining a facies type of one or more facies units;
categorizing one or more facies units; and
connecting one or more facies units to create a reservoir model.

30. The information handling system of claim 29, where determining the facies type of one or more facies units includes:
dividing one or more reservoirs into one or more sections; and
for one or more sections:
determining the average RSSRSS of the section; and
determining the facies type of the facies unit based, at least in part, on the average RSSRSS of one or more of the sections.

31. The information handling system of claim 29, where identifying one or more facies units based on RSSRSS values includes:
identifying one or more compound facies units, where each compound facies units includes at least two reservoir beds separated by a non-reservoir area with a thickness that is less than a maximum thickness to separate individual bed thicknesses.

32. The information handling system of claim 29, where identifying one or more facies units based on RSSRSS values includes:
determining a first cutoff RSSRSS value indicative of a reservoir bed boundary, where first cutoff RSSRSS value is based at least in part on one or more of one or more of the a resistivity of the mud ($R_M$), a resistivity of the mud filtrate ($R_{MF}$), and a resistance of permeable reservoir deposit connate water ($R_W$), a resistance of confining or surrounding shale or SSRSS for a well ($R_{SH}$), and a resistance of uninvaded permeable reservoir deposits ($R_T$).

33. The information handling system of claim 29, where identifying one or more facies units based on RSSRSS values includes:
determining a second cutoff RSSRSS value based, at least in part, on an inflection point of the RSSRSS curve for a facies unit.

34. The information handling system of claim 29, where identifying one or more facies units based on RSSRSS values includes:
identifying one or more compound facies units, where each compound facies units includes at least two reservoir beds separated by a non-reservoir area with a thickness that is less than a maximum thickness to separate individual bed thicknesses.

35. The information handling system of claim 29, the process further including:
determining at least one zero boundary region about a zero reservoir well.

36. The information handling system of claim 35, where determining at least one zero boundary region about a zero reservoir well includes:
connecting two or more zero-reservoir wells to create a zero corridor.

37. The information handling system of claim 35, where determining at least one zero boundary region about a zero reservoir well includes:
for one or more zero-reservoir wells:
constructing a ray to a non zero-reservoir well;
terminating the ray at a zero point; and
connecting one or more zero points.

38. The information handling system of claim 29, where connecting one or more facies units to create a reservoir model includes:
projecting bumpers around one or more wells; and
for one or more rounds:
connecting one or more facies units according to a rule set.

39. The information handling system of claim 38, where the rule set includes:
a maximum sinuosity for a connection between wells.

40. The information handling system of claim 38, where the rule set is to model a self-similar system.

41. The information handling system of claim 29, the process further comprising:

ranking one or more facies units for at least one classification of facies units.

42. The information handling system of claim 41, where connecting one or more facies units to create a reservoir model includes:

connecting one or more facies units based, at least in part, on a ranking of one or more facies units.

* * * * *